United States Patent
Bhattacharya et al.

(10) Patent No.: US 12,550,198 B2
(45) Date of Patent: Feb. 10, 2026

(54) WIRELESS CHANNEL ACCESS USING RECEIVER INTERFERENCE ENVIRONMENT

(71) Applicant: QUALCOMM Incorporated, San Diego, CA (US)

(72) Inventors: Abhijit Bhattacharya, Bangalore (IN); Sudheer Manjunath Poojary, Bengaluru (IN); Akshay Kumar Bajpai, Bangalore (IN); Manikandan Chandrasekar, Bangalore (IN); Raj Kumar Krishna Kumar, Bangalore (IN)

(73) Assignee: QUALCOMM Incorporated, San Diego, CA (US)

( * ) Notice: Subject to any disclaimer, the term of this patent is extended or adjusted under 35 U.S.C. 154(b) by 438 days.

(21) Appl. No.: 18/162,670

(22) Filed: Jan. 31, 2023

(65) Prior Publication Data
US 2024/0260094 A1    Aug. 1, 2024

(51) Int. Cl.
*H04W 74/08* (2024.01)
*H04B 17/318* (2015.01)
*H04B 17/336* (2015.01)
*H04W 74/0833* (2024.01)

(52) U.S. Cl.
CPC ........ *H04W 74/085* (2013.01); *H04B 17/318* (2015.01); *H04B 17/336* (2015.01)

(58) Field of Classification Search
CPC .. H04W 74/085; H04B 17/318; H04B 17/336
See application file for complete search history.

(56) References Cited

U.S. PATENT DOCUMENTS

| 2016/0249366 A1* | 8/2016 | Seok .................. H04W 72/541 |
| 2018/0084548 A1 | 3/2018 | Min et al. |
| 2018/0249501 A1* | 8/2018 | Ko ..................... H04W 52/243 |
| 2021/0360694 A1 | 11/2021 | Pandian et al. |
| 2022/0174691 A1* | 6/2022 | Xia .................. H04W 74/0816 |

FOREIGN PATENT DOCUMENTS

CN    1462524 A    * 12/2003    ............ H04W 16/14

OTHER PUBLICATIONS

International Search Report and Written Opinion dated Mar. 14, 2024 from corresponding PCT Application No. PCT/US2023/081668.

* cited by examiner

*Primary Examiner* — Derrick V Rose
(74) *Attorney, Agent, or Firm* — ArentFox Schiff, LLP and Qualcomm, Incorporated

(57) ABSTRACT

This disclosure provides methods, devices and systems for clear channel assessment (CCA) for wireless communications in wireless local area networks (WLANs). In some aspects, an access point (AP) may detect an interfering transmission associated with an overlapping basic service set (OBSS). The AP may further transmit, to at least one station (STA), a probe frame soliciting information indicating an interference environment observed by the at least one STA when an interfering transmission fails to satisfy an interference criterion associated with the AP. The AP may further transmit the probe frame to the at least one STA after a backoff period when the interfering transmission satisfies the interference criterion associated with the AP.

30 Claims, 10 Drawing Sheets

WIRELESS CHANNEL ACCESS USING RECEIVER INTERFERENCE ENVIRONMENT

TECHNICAL FIELD

This disclosure relates generally to wireless communication, and more specifically, to a wireless local area network (WLAN) in which access to a wireless channel by a transmitter is predicated upon interference experienced by a receiver.

DESCRIPTION OF THE RELATED TECHNOLOGY

A wireless local area network (WLAN) may be formed by one or more access points (APs) that provide a shared wireless communication medium for use by a number of client devices also referred to as stations (STAs). The basic building block of a WLAN conforming to the Institute of Electrical and Electronics Engineers (IEEE) 802.11 family of standards is a Basic Service Set (BSS), which is managed by an AP. Each BSS is identified by a Basic Service Set Identifier (BSSID) that is advertised by the AP. An AP periodically broadcasts beacon frames to enable any STAs within wireless range of the AP to establish or maintain a communication link with the WLAN.

Many existing WLAN communication protocols are designed for wireless communications on shared wireless mediums. That is, a wireless medium is expected to simultaneously serve multiple devices. In order for transmissions to be successfully received and decoded by receivers, some method for channel access may be implemented. A channel access method may specify procedures for multiple devices to communicate on the same wireless medium. As WLAN communication protocols and device capabilities evolve to enable enhanced features, new channel access methods are needed to support an increasing amount of traffic on shared wireless mediums.

SUMMARY

The systems, methods and devices of this disclosure each have several innovative aspects, no single one of which is solely responsible for the desirable attributes disclosed herein.

One innovative aspect of the subject matter described in this disclosure can be implemented as a method of wireless communication. The method may be performed by an apparatus, such as a wireless access point (AP) or a component thereof. The method includes transmitting, to at least one second apparatus, a probe frame soliciting information indicating an interference environment observed by the at least one second apparatus when an interfering transmission associated with an overlapping basic service set (OBSS) fails to satisfy an interference criterion associated with the first apparatus. The method further includes transmitting the probe frame to the at least one second apparatus after a backoff period when the interfering transmission satisfies the interference criterion associated with the first apparatus.

In some aspects, the interference criterion includes a threshold for a signal strength of the interfering transmission or a flag in a preamble of the interfering transmission.

In some aspects, the interfering transmission indicates a duration that a wireless medium shared with the OBSS is to be occupied by the OBSS, and the backoff period is associated with the duration when the interfering transmission satisfies the interference criterion.

In some aspects, the method may further include receiving a response frame from the at least one second apparatus including the information indicating the interference environment observed by the at least one second apparatus; and transmitting, to the at least one second apparatus, at least one data frame with a set of transmission parameters that is adapted using the information indicating the interference environment observed by the at least one second apparatus when a transmission parameter of the set of transmission parameters satisfies a threshold.

In some aspects, the transmission parameter of the set of transmission parameters includes a transmission rate associated with transmitting the at least one data frame to the at least one second apparatus.

In some aspects, the at least one data frame is transmitted on top of the interfering transmission associated with the OBSS.

In some aspects, the response frame includes a block acknowledgement (ACK) frame that further includes the information indicating the interference environment observed by the at least one second apparatus.

In some aspects, the method may further include selecting, for transmission of the at least one data frame, each transmission parameter of the set of transmission parameters using the information indicating the interference environment observed by the at least one second apparatus.

In some aspects, the set of transmission parameters includes at least one of a transmission rate, a transmission power, a modulation and coding scheme (MCS), or a number of spatial streams (NSS).

In some aspects, the information indicating the interference environment observed by the at least one second apparatus includes at least one of: one or more transmission parameters of the set of transmission parameters, a signal-to-noise ratio (SNR), a received signal strength indicator (RSSI), or an interference level associated with the interference environment.

Another innovative aspect of the subject matter described in this disclosure can be implemented in an apparatus, such as a wireless AP or a component thereof. In some implementations, a first apparatus may include at least one memory and at least one processor communicatively coupled with the at least one memory and configured to cause the first apparatus to transmit, to at least one second apparatus, a probe frame soliciting information indicating an interference environment observed by the at least one second apparatus when an interfering transmission associated with an OBSS fails to satisfy an interference criterion associated with the first apparatus. The at least one processor is further configured to cause the first apparatus to transmit the probe frame to the at least one second apparatus after a backoff period when the interfering transmission satisfies the interference criterion associated with the first apparatus.

Another innovative aspect of the subject matter described in this disclosure can be implemented in an apparatus, such as a wireless AP or a component thereof. In some implementations, a first apparatus includes means for transmitting, to at least one second apparatus, a probe frame soliciting information indicating an interference environment observed by the at least one second apparatus when an interfering transmission associated with an OBSS fails to satisfy an interference criterion associated with the first apparatus. The first apparatus further includes means for transmitting the probe frame to the at least one second apparatus after a backoff period when the interfering transmission satisfies the interference criterion associated with the first apparatus.

Another innovative aspect of the subject matter described in this disclosure can be implemented in a computer-readable medium storing computer-executable code for wireless communication by a first apparatus, such as an AP or a component thereof. In some implementations, the code, when executed by a processor, causes the processor to transmit, to at least one second apparatus, a probe frame soliciting information indicating an interference environment observed by the at least one second apparatus when an interfering transmission associated with an OBSS fails to satisfy an interference criterion associated with the first apparatus. The code, when executed by the processor, further causes the processor to transmit the probe frame to the at least one second apparatus after a backoff period when the interfering transmission satisfies the interference criterion associated with the first apparatus.

Details of one or more implementations of the subject matter described in this disclosure are set forth in the accompanying drawings and the description below. Other features, aspects, and advantages will become apparent from the description, the drawings and the claims. Note that the relative dimensions of the following figures may not be drawn to scale.

BRIEF DESCRIPTION OF THE DRAWINGS

Like reference numbers and designations in the various drawings indicate like elements.

DETAILED DESCRIPTION

Figure 1:
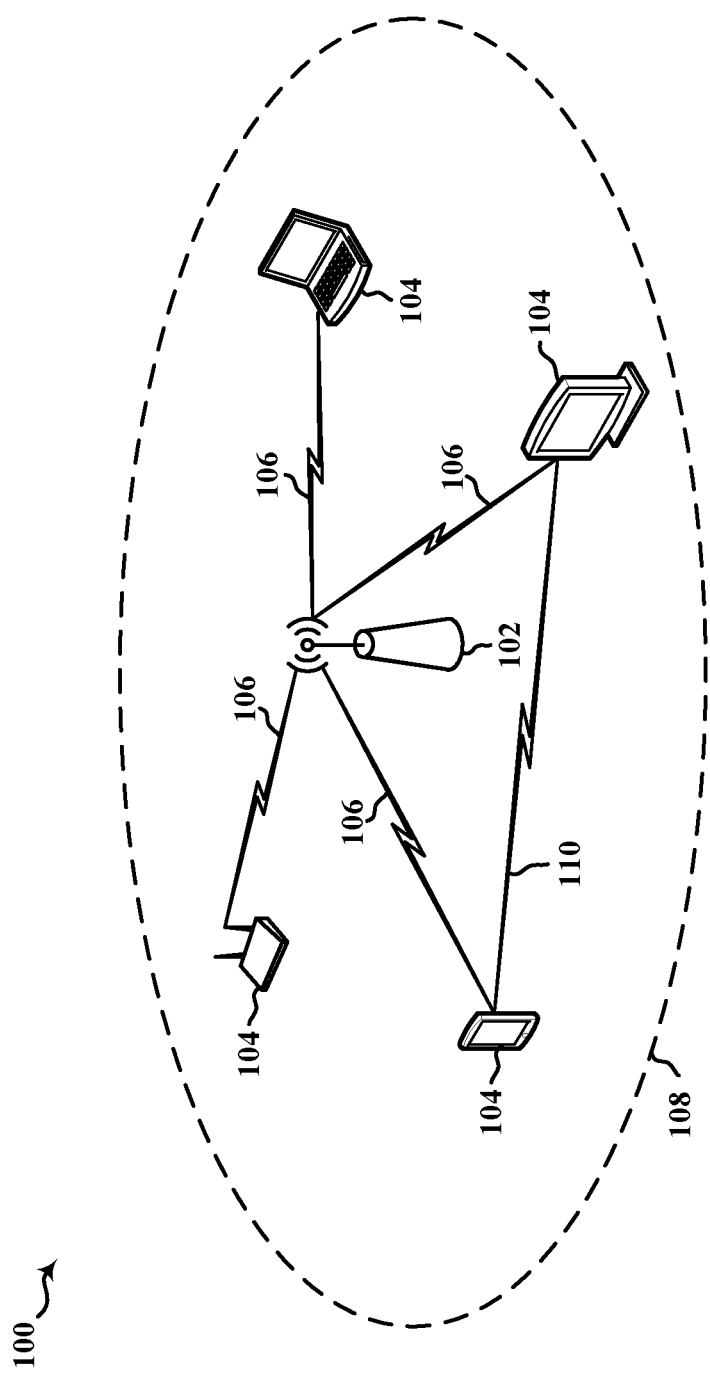
FIG. 1 shows a pictorial diagram of an example wireless communication network.

The following description is directed to certain implementations for the purposes of describing innovative aspects of this disclosure. However, a person having ordinary skill in the art will readily recognize that the teachings herein can be applied in a multitude of different ways. The described implementations can be implemented in any device, system or network that is capable of transmitting and receiving radio frequency (RF) signals according to one or more of the Institute of Electrical and Electronics Engineers (IEEE) 802.11 standards, the IEEE 802.15 standards, the Bluetooth® standards as defined by the Bluetooth Special Interest Group (SIG), or the Long Term Evolution (LTE), 3G, 4G or 5G (New Radio (NR)) standards promulgated by the 3rd Generation Partnership Project (3GPP), among others. The described implementations can be implemented in any device, system or network that is capable of transmitting and receiving RF signals according to one or more of the following technologies or techniques: code division multiple access (CDMA), time division multiple access (TDMA), frequency division multiple access (FDMA), orthogonal FDMA (OFDMA), single-carrier FDMA (SC-FDMA), single-user (SU) multiple-input multiple-output (MIMO) and multi-user (MU) MIMO. The described implementations also can be implemented using other wireless communication protocols or RF signals suitable for use in one or more of a wireless personal area network (WPAN), a wireless local area network (WLAN), a wireless wide area network (WWAN), or an internet of things (IoT) network.

New WLAN communication protocols are being developed to enable enhanced features for wireless communications on frequency bands that accommodate a substantial (and increasing) amount of traffic. As the number of wireless communications devices on wireless mediums is expected to steadily grow, the potential for interference and the competition for resources can be expected to proportionally increase. Assuming the aforementioned trends continue, inefficient channel access and resource allocation mechanisms will become increasingly costly and will hinder advancements in the WLAN space. As wireless mediums are finite and (conventionally) shared, channel access mechanisms are crucial to stable and reliable communication on a wireless medium. Such channel access mechanisms may reduce interference, prevent collisions, and increase resource utilization. For example, clear channel assessment (CCA) procedures, such as "Listen Before Talk" (LBT) or carrier sense multiple access (CSMA), in Wi-Fi are intended to facilitate sharing of the wireless medium in a fair manner.

According to various aspects of the present disclosure, an interference environment may refer to one or both of the interference conditions and the propagation channel conditions experienced at a device, such as a transmitter or a receiver. In many instances, clear channel assessment is predicated upon the interference environment of the transmitter, such as the AP, and so neglects the interference environment experienced by the receiver, such as the STA. For example, the transmitter senses the wireless channel within range of the transmitter, and those channel conditions are assumed to be applicable to the receiver, as well. Consequently, the transmitter may select a modulation and coding scheme (MCS), number of spatial streams ($N_{SS}$), and other such transmission parameters based on the channel conditions detected at the transmitter; however, this selection may be inaccurate due to the differences in the environments of the transmitter and receiver. If the degree of inaccuracy is too great, the receiver may be unable to successfully receive and decode the transmission from the transmitter, which may result in additional latency as the transmitter attempts to find suitable transmission parameters for communicating with the receiver.

Such an approach results from the inability of the transmitter to obtain measurements a priori that reflect interference at the receiver. Existing approaches to informing a transmitter of the interference environment experienced at the receiver may involve overhead that prohibits informing the transmitter of the interference environment at the receiver in advance of initiating data transmission to the receiver. However, the evolution of devices and enhancements in features may enable different mechanisms for reporting channel conditions, including lightweight mechanisms that allow for faster, earlier, or more frequent reporting. Such mechanisms may be employed by a transmitter to adapt MCSs, $N_{SS}$, or other transmission parameters at an earlier time or a more frequent periodicity. An example of such a mechanism may be included in a Wi-Fi (for example, one or more such mechanisms may be defined by future IEEE 802.11 standards) and may be referred to as "fast rate adaptation," "fast channel quality information," or "fast channel condition reporting." In the present disclosure, such a mechanism that provides for faster, earlier, or more frequent reporting of channel conditions (relative to existing solutions) so as to enable a transmitter to adapt MCSs, $N_{SS}$, or other transmission parameters at an earlier time (such as a priori) or a more frequent periodicity may be referred to as "channel conditions reporting" (CCR) (note that such a feature may be differently named in a standard or other document).

CCR is a feature intended to enable accurate rate prediction for Wi-Fi by quickly and frequently transmitting, to a transmitter, feedback regarding the channel conditions (or channel quality) observed by the receiver. The speed and frequency of CCR provides a unified design that is well-suited to bursty interference and fast channel changes. In particular, a receiver configured to perform CCR may attach a report to ACK feedback, with the report including one or more measurements or other values indicative of the interference environment experienced by the receiver. For example, CCR may be attached to a block ACK. As the receiver will likely acknowledge successfully received packets, and some or all of the ACK feedback messages transmitted in response may include CCR, the transmitter may be able to quickly and frequently adjust transmission parameters to be suitable for communication with the receiver.

Various aspects relate generally to wireless communications in WLANs, and more particularly, to clear channel assessment procedures used to sense and reserve a wireless medium when transmitting data in a WLAN. In some aspects, CCR is employed to enhance clear channel assessment procedures. In particular, a transmitter may transmit a probe frame to initiate a transmission opportunity (TxOP) even if the channel occupancy status is not clear, such as where the transmitter detects a PPDU associated with an overlapping basic service set (OBSS). The transmitter may maintain a random backoff (RBO) timer, and the transmitter may transmit the probe frame upon expiration of such an RBO timer.

The probe transmission by the transmitter may be unlikely to introduce substantial interference to the ongoing transmission occupying the channel. Further, the probe frame may be configured to elicit CCR from an STA. Thus, rather than assume the interference environment at the transmitter is sufficiently representative of that at the receiver, the transmitter may be provided with CCR indicating the channel conditions observed at the receiver. The transmitter may obtain, select, ascertain, or determine a set of transmission parameters for communication with the STA using information from CCR—for example, the transmitter may use information from CCR to select at least one of a transmission rate, a transmission power, an MCS, or an $N_{SS}$.

If one or more of the obtained, selected, ascertained, or determined transmission parameters are found to be satisfactory (such as where the transmission rate satisfies a threshold), the transmitter may transmit a data frame on top of the ongoing PPDU transmission associated with the OBSS. However, if one or more of the obtained, selected, ascertained, or determined transmission parameters are found to be unsatisfactory (such as where the transmission rate fails to satisfy a threshold), the transmitter may assume that the channel occupancy status proximate to the receiver is unsuitable for transmission of the data frame at that time. Therefore, the transmitter may defer to the ongoing PPDU transmission associated with the OBSS, such as by deferring for the duration of the NAV indicated in the PPDU.

Potentially, the transmitter may fail to receive a response to the probe frame entirely. For example, the transmitter may fail to receive a response to the probe frame, such as when the interference environment proximate to the receiver prevents successful reception or decoding of the probe frame. In some aspects of such instances, the transmitter may retransmit the probe after a backoff period, which may be a configurable duration, such as one millisecond (ms). By waiting the backoff period, the interference proximate to the receiver may dissipate, thereby increasing the probability that the receiver will successfully receive and decode the retransmitted probe frame. In some aspects, however, the transmitter may refrain from increasing the contention window for retransmission of the probe.

Particular implementations of the subject matter described in the present disclosure can be implemented to realize one or more of the following potential advantages. By using CCR from a receiver (that is, channel quality feedback from the receiver), spectral efficiency may be improved, as a transmitter may effectively know the channel conditions at the receiver apriori when initiating a data transmission. Such an approach may allow the transmitter to adapt various transmission parameters for data transmission to be suitable for the environment of the receiver, and may allow the transmitter to transmit in instances in which the channel would otherwise be considered to be occupied had the transmitter blindly deferred transmission based on an LBT or similar CCA procedure.

Further, the concepts and various aspects described in the present disclosure may increase throughput and reduce latency. First, the aforementioned improved spectral efficiency may correspond to the potential advantages of increased throughput and reduced latency, as a greater amount of resources are likely to be utilized with various implementations of the present disclosure. Second, the a priori knowledge at the transmitter of the interference environment observed by the receiver when initiating a data transmission may allow the transmitter to select transmission parameters (such as MCS, $N_{SS}$, transmission rate, transmission power, and so forth) that are more suitable for communication with the receiver than if the transmitter were to estimate such parameters based on the environment proximate to the transmitter. The more accurate selection of such transmission parameters may reduce the probability of unsuccessful reception and decoding of data transmissions at the receiver, which in turn may reduce the number of retransmissions needed for the receiver to successfully receive and decode the data transmissions.

FIG. 1 shows a block diagram of an example wireless communication network 100. According to some aspects, the wireless communication network 100 can be an example of a wireless local area network (WLAN) such as a Wi-Fi network (and will hereinafter be referred to as WLAN 100).

For example, the WLAN 100 can be a network implementing at least one of the IEEE 802.11 family of wireless communication protocol standards (such as that defined by the IEEE 802.11-2020 specification or amendments thereof including, but not limited to, 802.11ah, 802.11ad, 802.11ay, 802.11ax, 802.11az, 802.11ba and 802.11be). The WLAN 100 may include numerous wireless communication devices such as an access point (AP) 102 and multiple stations (STAs) 104. While only one AP 102 is shown, the WLAN 100 also can include multiple APs 102.

Each of the STAs 104 also may be referred to as a mobile station (MS), a mobile device, a mobile handset, a wireless handset, an access terminal (AT), a user equipment (UE), a subscriber station (SS), or a subscriber unit, among other possibilities. The STAs 104 may represent various devices such as mobile phones, personal digital assistant (PDAs), other handheld devices, netbooks, notebook computers, tablet computers, laptops, display devices (for example, TVs, computer monitors, navigation systems, among others), music or other audio or stereo devices, remote control devices ("remotes"), printers, kitchen or other household appliances, key fobs (for example, for passive keyless entry and start (PKES) systems), among other possibilities.

A single AP 102 and an associated set of STAs 104 may be referred to as a basic service set (BSS), which is managed by the respective AP 102. FIG. 1 additionally shows an example coverage area 108 of the AP 102, which may represent a basic service area (BSA) of the WLAN 100. The BSS may be identified to users by a service set identifier (SSID), as well as to other devices by a basic service set identifier (BSSID), which may be a medium access control (MAC) address of the AP 102. The AP 102 periodically broadcasts beacon frames ("beacons") including the BSSID to enable any STAs 104 within wireless range of the AP 102 to "associate" or re-associate with the AP 102 to establish a respective communication link 106 (hereinafter also referred to as a "Wi-Fi link"), or to maintain a communication link 106, with the AP 102. For example, the beacons can include an identification of a primary channel used by the respective AP 102 as well as a timing synchronization function for establishing or maintaining timing synchronization with the AP 102. The AP 102 may provide access to external networks to various STAs 104 in the WLAN via respective communication links 106.

To establish a communication link 106 with an AP 102, each of the STAs 104 is configured to perform passive or active scanning operations ("scans") on frequency channels in one or more frequency bands (for example, the 2.4 GHz, 5 GHz, 6 GHz or 60 GHz bands). To perform passive scanning, a STA 104 listens for beacons, which are transmitted by respective APs 102 at a periodic time interval referred to as the target beacon transmission time (TBTT) (measured in time units (TUs) where one TU may be equal to 1024 microseconds ($\mu s$)). To perform active scanning, a STA 104 generates and sequentially transmits probe requests on each channel to be scanned and listens for probe responses from APs 102. Each STA 104 may be configured to identify or select an AP 102 with which to associate based on the scanning information obtained through the passive or active scans, and to perform authentication and association operations to establish a communication link 106 with the selected AP 102. The AP 102 assigns an association identifier (AID) to the STA 104 at the culmination of the association operations, which the AP 102 uses to track the STA 104.

As a result of the increasing ubiquity of wireless networks, a STA 104 may have the opportunity to select one of many BSSs within range of the STA or to select among multiple APs 102 that together form an extended service set (ESS) including multiple connected BSSs. An extended network station associated with the WLAN 100 may be connected to a wired or wireless distribution system that may allow multiple APs 102 to be connected in such an ESS. As such, a STA 104 can be covered by more than one AP 102 and can associate with different APs 102 at different times for different transmissions. Additionally, after association with an AP 102, a STA 104 also may be configured to periodically scan its surroundings to find a more suitable AP 102 with which to associate. For example, a STA 104 that is moving relative to its associated AP 102 may perform a "roaming" scan to find another AP 102 having more desirable network characteristics such as a greater received signal strength indicator (RSSI) or a reduced traffic load.

In some cases, STAs 104 may form networks without APs 102 or other equipment other than the STAs 104 themselves. One example of such a network is an ad hoc network (or wireless ad hoc network). Ad hoc networks may alternatively be referred to as mesh networks or peer-to-peer (P2P) networks. In some cases, ad hoc networks may be implemented within a larger wireless network such as the WLAN 100. In such implementations, while the STAs 104 may be capable of communicating with each other through the AP 102 using communication links 106, STAs 104 also can communicate directly with each other via direct wireless links 110. Additionally, two STAs 104 may communicate via a direct wireless link 110 regardless of whether both STAs 104 are associated with and served by the same AP 102. In such an ad hoc system, one or more of the STAs 104 may assume the role filled by the AP 102 in a BSS. Such a STA 104 may be referred to as a group owner (GO) and may coordinate transmissions within the ad hoc network. Examples of direct wireless links 110 include Wi-Fi Direct connections, connections established by using a Wi-Fi Tunneled Direct Link Setup (TDLS) link, and other P2P group connections.

The APs 102 and STAs 104 may function and communicate (via the respective communication links 106) according to the IEEE 802.11 family of wireless communication protocol standards (such as that defined by the IEEE 802.11-2016 specification or amendments thereof including, but not limited to, 802.11ah, 802.11ad, 802.11ay, 802.11ax, 802.11az, 802.11ba and 802.11be). These standards define the WLAN radio and baseband protocols for the physical (PHY) and medium access control (MAC) layers. The APs 102 and STAs 104 transmit and receive wireless communications (hereinafter also referred to as "Wi-Fi communications") to and from one another in the form of physical layer convergence protocol (PLCP) protocol data units (PPDUs). The APs 102 and STAs 104 in the WLAN 100 may transmit PPDUs over an unlicensed spectrum, which may be a portion of spectrum that includes frequency bands traditionally used by Wi-Fi technology, such as the 2.4 GHz band, the 5 GHz band, the 60 GHz band, the 3.6 GHz band, and the 700 MHz band. Some implementations of the APs 102 and STAs 104 described herein also may communicate in other frequency bands, such as the 6 GHz band, which may support both licensed and unlicensed communications. The APs 102 and STAs 104 also can be configured to communicate over other frequency bands such as shared licensed frequency bands, where multiple operators may have a license to operate in the same or overlapping frequency band or bands.

Each of the frequency bands may include multiple sub-bands or frequency channels. For example, PPDUs conforming to the IEEE 802.11n, 802.1 lac, 802.1 lax and 802.11be standard amendments may be transmitted over the 2.4 GHz, 5 GHz or 6 GHz bands, each of which is divided into multiple 20 MHz channels. As such, these PPDUs are transmitted over a physical channel having a minimum bandwidth of 20 MHz, but larger channels can be formed through channel bonding. For example, PPDUs may be transmitted over physical channels having bandwidths of 40 MHz, 80 MHz, 160 or 320 MHz by bonding together multiple 20 MHz channels.

Each PPDU is a composite structure that includes a PHY preamble and a payload in the form of a PHY service data unit (PSDU). The information provided in the preamble may be used by a receiving device to decode the subsequent data in the PSDU. In instances in which PPDUs are transmitted over a bonded channel, the preamble fields may be duplicated and transmitted in each of the multiple component channels. The PHY preamble may include both a legacy portion (or "legacy preamble") and a non-legacy portion (or "non-legacy preamble"). The legacy preamble may be used for packet detection, automatic gain control and channel estimation, among other uses. The legacy preamble also may generally be used to maintain compatibility with legacy devices. The format of, coding of, and information provided in the non-legacy portion of the preamble is based on the particular IEEE 802.11 protocol to be used to transmit the payload.

Figure 2A:
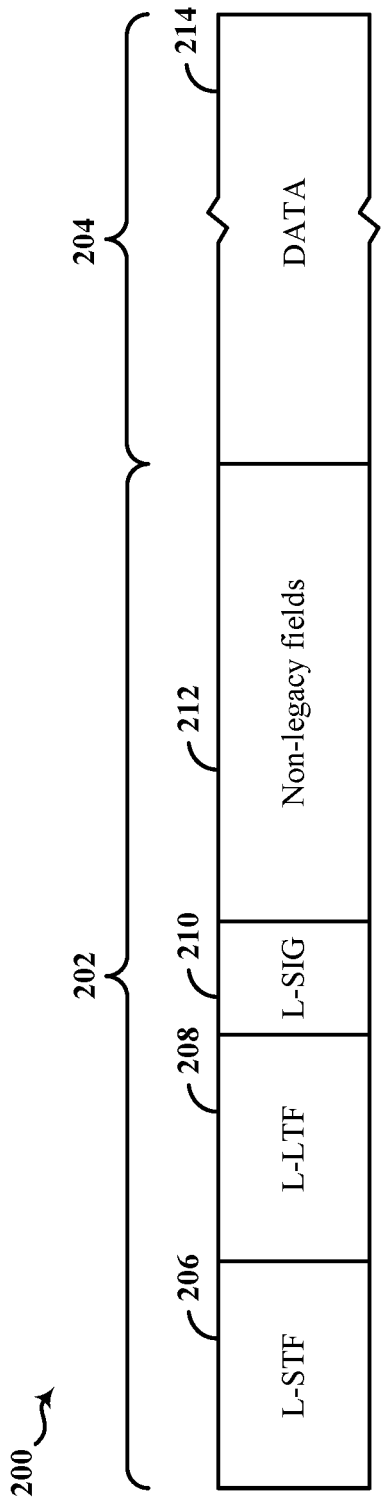
FIG. 2A shows an example protocol data unit (PDU) usable for communications between an access point (AP) and one or more wireless stations (STAs).

FIG. 2A shows an example protocol data unit (PDU) 200 usable for wireless communication between an AP 102 and one or more STAs 104. For example, the PDU 200 can be configured as a PPDU. As shown, the PDU 200 includes a PHY preamble 202 and a PHY payload 204. For example, the preamble 202 may include a legacy portion that itself includes a legacy short training field (L-STF) 206, which may consist of two BPSK symbols, a legacy long training field (L-LTF) 208, which may consist of two BPSK symbols, and a legacy signal field (L-SIG) 210, which may consist of two BPSK symbols. The legacy portion of the preamble 202 may be configured according to the IEEE 802.11a wireless communication protocol standard. The preamble 202 may also include a non-legacy portion including one or more non-legacy fields 212, for example, conforming to an IEEE wireless communication protocol such as the IEEE 802.11ac, 802.11ax, 802.11be or later wireless communication protocol protocols.

The L-STF 206 generally enables a receiving device to perform automatic gain control (AGC) and coarse timing and frequency estimation. The L-LTF 208 generally enables a receiving device to perform fine timing and frequency estimation and also to perform an initial estimate of the wireless channel. The L-SIG 210 generally enables a receiving device to obtain, select, ascertain, or determine a duration of the PDU and to use the obtained, selected, ascertained, or determined duration to avoid transmitting on top of the PDU. For example, the L-STF 206, the L-LTF 208 and the L-SIG 210 may be modulated according to a binary phase shift keying (BPSK) modulation scheme. The payload 204 may be modulated according to a BPSK modulation scheme, a quadrature BPSK (Q-BPSK) modulation scheme, a quadrature amplitude modulation (QAM) modulation scheme, or another appropriate modulation scheme. The payload 204 may include a PSDU including a data field (DATA) 214 that, in turn, may carry higher layer data, for example, in the form of medium access control (MAC) protocol data units (MPDUs) or an aggregated MPDU (A-MPDU).

Figure 2B:
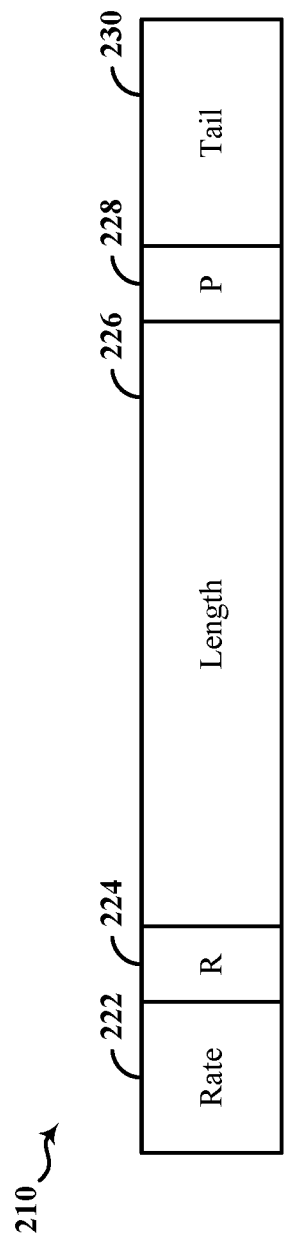
FIG. 2B shows an example field in the PDU of FIG. 2A.

FIG. 2B shows an example L-SIG 210 in the PDU 200 of FIG. 2A. The L-SIG 210 includes a data rate field 222, a reserved bit 224, a length field 226, a parity bit 228, and a tail field 230. The data rate field 222 indicates a data rate (note that the data rate indicated in the data rate field 222 may not be the actual data rate of the data carried in the payload 204). The length field 226 indicates a length of the packet in units of, for example, symbols or bytes. The parity bit 228 may be used to detect bit errors. The tail field 230 includes tail bits that may be used by the receiving device to terminate operation of a decoder (for example, a Viterbi decoder). The receiving device may utilize the data rate and the length indicated in the data rate field 222 and the length field 226 to obtain, select, ascertain, or determine a duration of the packet in units of, for example, microseconds (µs) or other time units.

Figure 3:
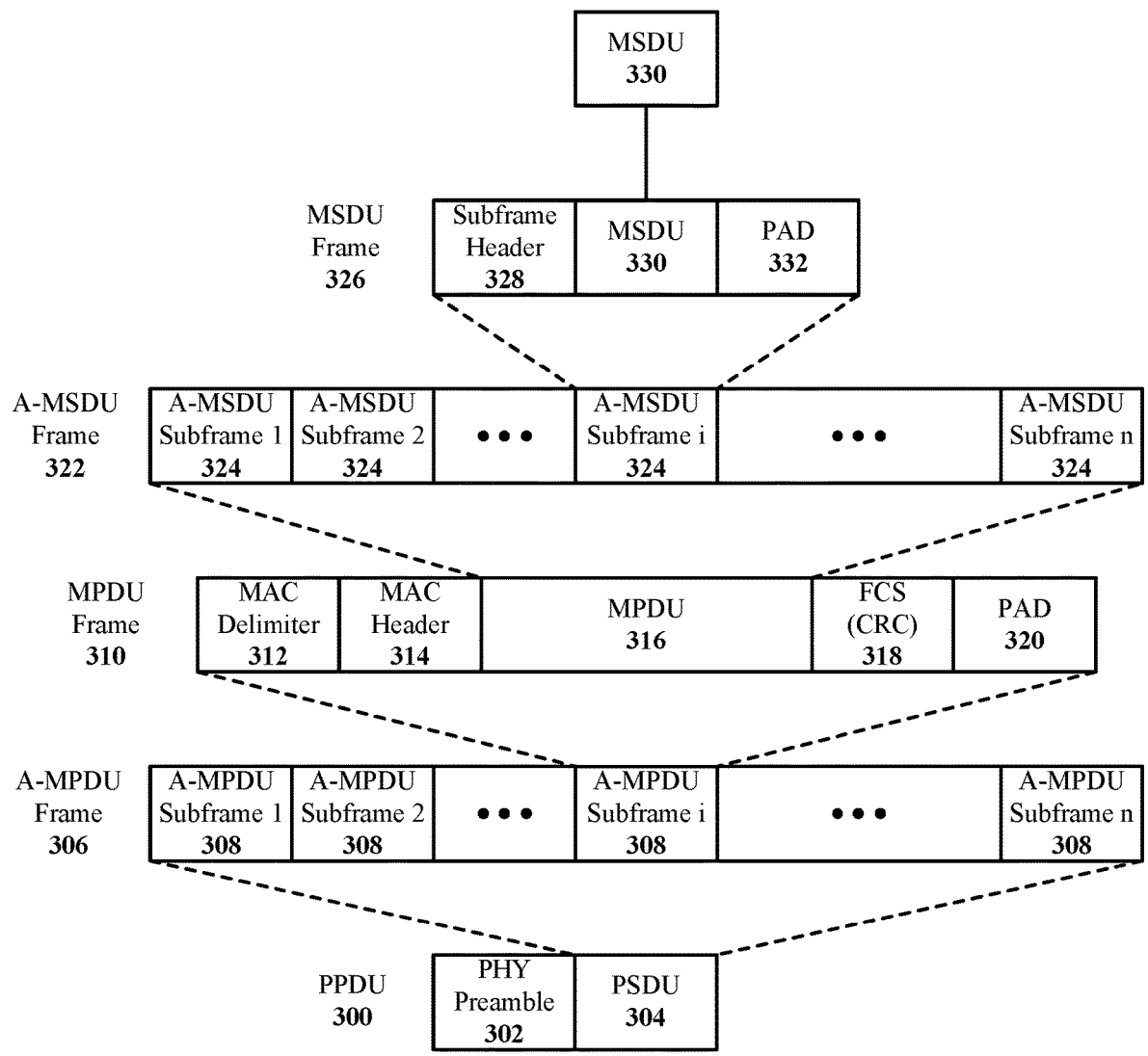
FIG. 3 shows an example physical layer convergence protocol (PLCP) protocol data unit (PPDU) usable for communications between an AP and one or more STAs.

FIG. 3 shows an example PPDU 300 usable for communications between an AP 102 and one or more STAs 104. As described above, each PPDU 300 includes a PHY preamble 302 and a PSDU 304. Each PSDU 304 may represent (or "carry") one or more MAC protocol data units (MPDUs) 316. For example, each PSDU 304 may carry an aggregated MPDU (A-MPDU) 306 that includes an aggregation of multiple A-MPDU subframes 308. Each A-MPDU subframe 306 may include an MPDU frame 310 that includes a MAC delimiter 312 and a MAC header 314 prior to the accompanying MPDU 316, which includes the data portion ("payload" or "frame body") of the MPDU frame 310. Each MPDU frame 310 may also include a frame check sequence (FCS) field 318 for error detection (for example, the FCS field may include a cyclic redundancy check (CRC)) and padding bits 320. The MPDU 316 may carry one or more MAC service data units (MSDUs) 326. For example, the MPDU 316 may carry an aggregated MSDU (A-MSDU) 322 including multiple A-MSDU subframes 324. Each A-MSDU subframe 324 contains a corresponding MSDU 330 preceded by a subframe header 328 and in some cases followed by padding bits 332.

Referring back to the MPDU frame 310, the MAC delimiter 312 may serve as a marker of the start of the associated MPDU 316 and indicate the length of the associated MPDU 316. The MAC header 314 may include multiple fields containing information that defines or indicates characteristics or attributes of data encapsulated within the frame body, including the MPDU 316. The MAC header 314 includes a duration field indicating a duration extending from the end of the PPDU until at least the end of an acknowledgment (ACK) or Block ACK (BA) of the PPDU that is to be transmitted by the receiving wireless communication device. The use of the duration field serves to reserve the wireless medium for the indicated duration, and enables the receiving device to establish its network allocation vector (NAV). The MAC header 314 also includes one or more fields indicating addresses for the data encapsulated within the frame body (that is, MPDU 316). For example, the MAC header 314 may include a combination of a source address, a transmitter address, a receiver address or a destination address. The MAC header 314 may further include a frame control field containing control information. The frame control field may specify a frame type, for example, a data frame, a control frame, or a management frame.

Figure 4:
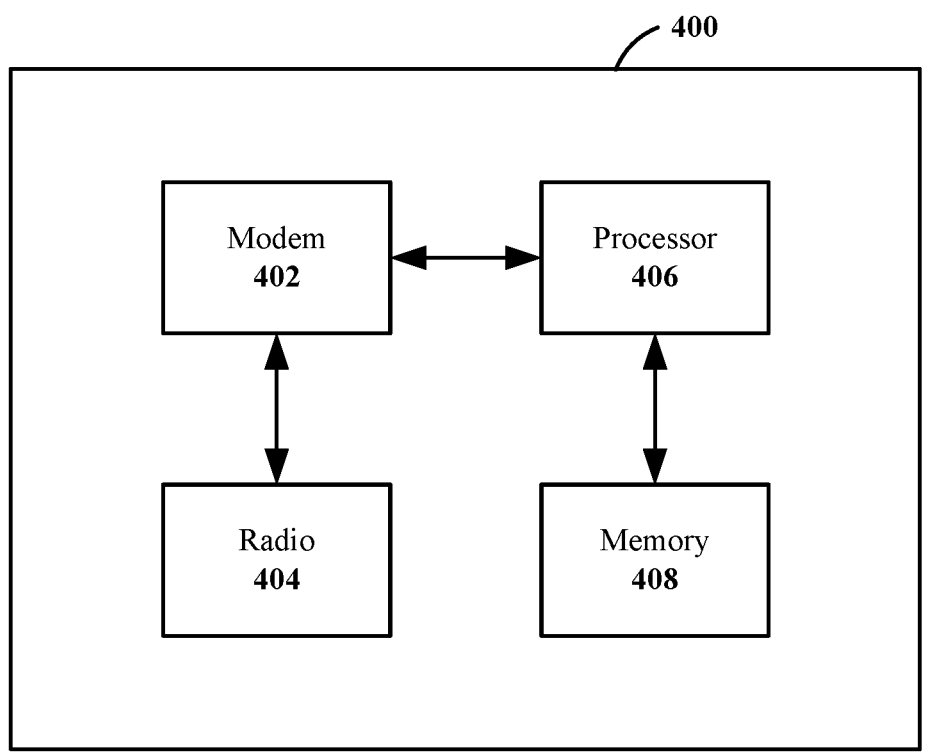
FIG. 4 shows a block diagram of an example wireless communication device.

FIG. 4 shows a block diagram of an example wireless communication device 400. In some implementations, the wireless communication device 400 can be an example of a device for use in a STA such as one of the STAs 104 described with reference to FIG. 1. In some implementations, the wireless communication device 400 can be an example of a device for use in an AP such as the AP 102 described with reference to FIG. 1. The wireless communication device 400 is capable of transmitting (or outputting for transmission) and receiving wireless communications (for example, in the form of wireless packets). For example, the wireless communication device can be configured to transmit and receive packets in the form of physical layer convergence protocol (PLCP) protocol data units (PPDUs) and medium access control (MAC) protocol data units (MPDUs) conforming to an IEEE 802.11 wireless communication protocol standard, such as that defined by the IEEE 802.11-2016 specification or amendments thereof including, but not limited to, 802.11ah, 802.11ad, 802.11ay, 802.11ax, 802.11az, 802.11ba and 802.11be.

The wireless communication device 400 can be, or can include, a chip, system on chip (SoC), chipset, package or device that includes one or more modems 402, for example, a Wi-Fi (IEEE 802.11 compliant) modem. In some implementations, the one or more modems 402 (collectively "the modem 402") additionally include a WWAN modem (for example, a 3GPP 4G LTE or 5G compliant modem). In some implementations, the wireless communication device 400 also includes one or more radios 404 (collectively "the radio 404"). In some implementations, the wireless communication device 400 further includes one or more processors, processing blocks or processing elements 406 (collectively "the processor 406") and one or more memory blocks or elements 408 (collectively "the memory 408").

The modem 402 can include an intelligent hardware block or device such as, for example, an application-specific integrated circuit (ASIC) among other possibilities. The modem 402 is generally configured to implement a PHY layer. For example, the modem 402 is configured to modulate packets and to output the modulated packets to the radio 404 for transmission over the wireless medium. The modem 402 is similarly configured to obtain modulated packets received by the radio 404 and to demodulate the packets to provide demodulated packets. In addition to a modulator and a demodulator, the modem 402 may further include digital signal processing (DSP) circuitry, automatic gain control (AGC), a coder, a decoder, a multiplexer and a demultiplexer. For example, while in a transmission mode, data obtained from the processor 406 is provided to a coder, which encodes the data to provide encoded bits. The encoded bits are then mapped to points in a modulation constellation (using a selected MCS) to provide modulated symbols. The modulated symbols may then be mapped to a number $N_{SS}$ of spatial streams or a number $N_{STS}$ of space-time streams. The modulated symbols in the respective spatial or space-time streams may then be multiplexed, transformed via an inverse fast Fourier transform (IFFT) block, and subsequently provided to the DSP circuitry for Tx windowing and filtering. The digital signals may then be provided to a digital-to-analog converter (DAC). The resultant analog signals may then be provided to a frequency upconverter, and ultimately, the radio 404. In implementations involving beamforming, the modulated symbols in the respective spatial streams are precoded via a steering matrix prior to their provision to the IFFT block.

While in a reception mode, digital signals received from the radio 404 are provided to the DSP circuitry, which is configured to acquire a received signal, for example, by detecting the presence of the signal and estimating the initial timing and frequency offsets. The DSP circuitry is further configured to digitally condition the digital signals, for example, using channel (narrowband) filtering, analog impairment conditioning (such as correcting for I/Q imbalance), and applying digital gain to ultimately obtain a narrowband signal. The output of the DSP circuitry may then be fed to the AGC, which is configured to use information extracted from the digital signals, for example, in one or more received training fields, to obtain, select, ascertain, or determine an appropriate gain. The output of the DSP circuitry also is coupled with the demodulator, which is configured to extract modulated symbols from the signal and, for example, compute the logarithm likelihood ratios (LLRs) for each bit position of each subcarrier in each spatial stream. The demodulator is coupled with the decoder, which may be configured to process the LLRs to provide decoded bits. The decoded bits from all of the spatial streams are then fed to the demultiplexer for demultiplexing. The demultiplexed bits may then be descrambled and provided to the MAC layer (the processor 406) for processing, evaluation or interpretation.

The radio 404 generally includes at least one radio frequency (RF) transmitter (or "transmitter chain") and at least one RF receiver (or "receiver chain"), which may be combined into one or more transceivers. For example, the RF transmitters and receivers may include various DSP circuitry including at least one power amplifier (PA) and at least one low-noise amplifier (LNA), respectively. The RF transmitters and receivers may, in turn, be coupled to one or more antennas. For example, in some implementations, the wireless communication device 400 can include, or be coupled with, multiple transmit antennas (each with a corresponding transmit chain) and multiple receive antennas (each with a corresponding receive chain). The symbols output from the modem 402 are provided to the radio 404, which then transmits the symbols via the coupled antennas. Similarly, symbols received via the antennas are obtained by the radio 404, which then provides the symbols to the modem 402.

The processor 406 can include an intelligent hardware block or device such as, for example, a processing core, a processing block, a central processing unit (CPU), a microprocessor, a microcontroller, a digital signal processor (DSP), an application-specific integrated circuit (ASIC), a programmable logic device (PLD) such as a field programmable gate array (FPGA), discrete gate or transistor logic, discrete hardware components, or any combination thereof designed to perform the functions described herein. The processor 406 processes information received through the radio 404 and the modem 402, and processes information to be output through the modem 402 and the radio 404 for transmission through the wireless medium. For example, the processor 406 may implement a control plane and MAC layer configured to perform various operations related to the generation and transmission of MPDUs, frames or packets. The MAC layer is configured to perform or facilitate the coding and decoding of frames, spatial multiplexing, space-time block coding (STBC), beamforming, and OFDMA resource allocation, among other operations or techniques. In some implementations, the processor 406 may generally control the modem 402 to cause the modem to perform various operations described above.

The memory 408 can include tangible storage media such as random-access memory (RAM) or read-only memory (ROM), or combinations thereof. The memory 408 also can store non-transitory processor- or computer-executable software (SW) code containing instructions that, when executed by the processor 406, cause the processor to perform various operations described herein for wireless communication, including the generation, transmission, reception and interpretation of MPDUs, frames or packets. For example, various functions of components disclosed herein, or various blocks or steps of a method, operation, process or algorithm disclosed herein, can be implemented as one or more modules of one or more computer programs.

Figure 5B:
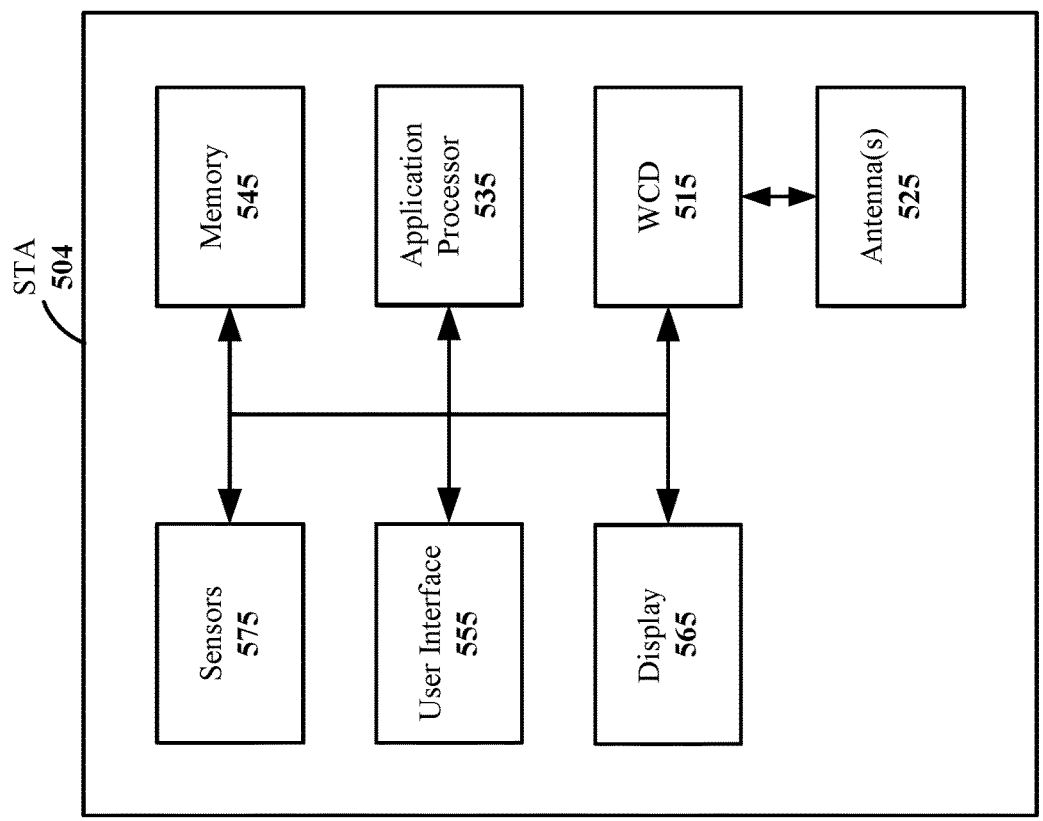
FIG. 5B shows a block diagram of an example STA.
Figure 5A:
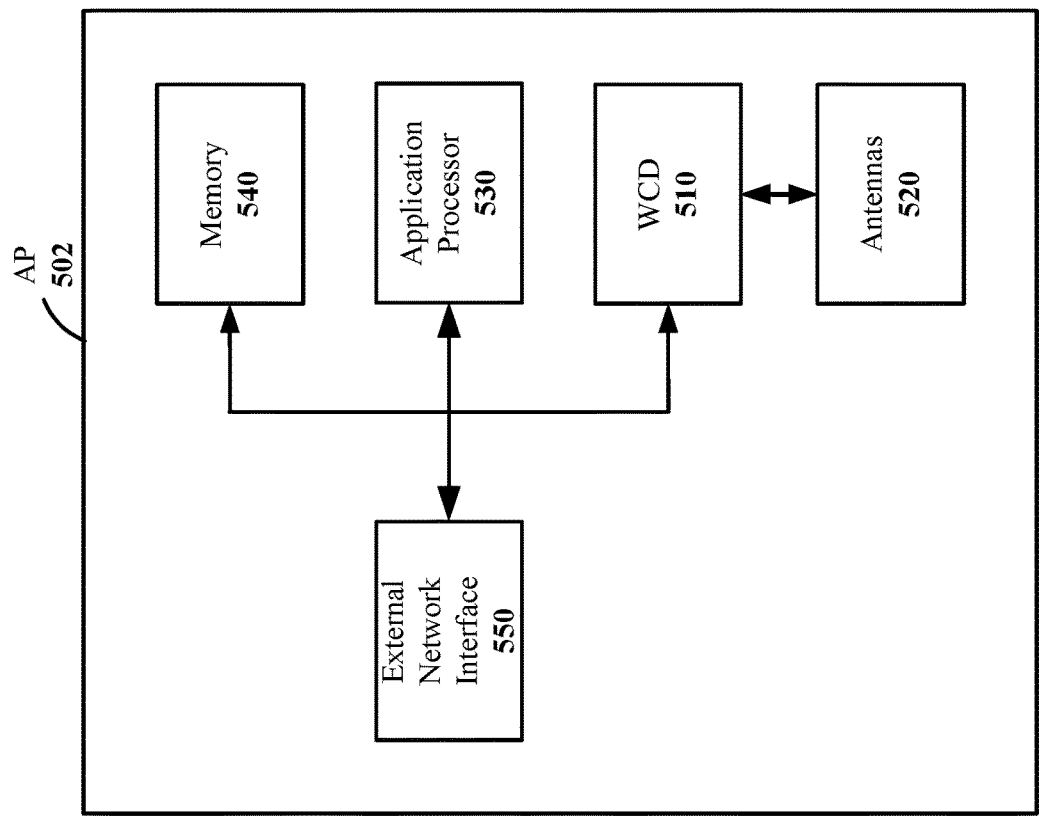
FIG. 5A shows a block diagram of an example AP.

FIG. 5A shows a block diagram of an example AP 502. For example, the AP 502 can be an example implementation of the AP 102 described with reference to FIG. 1. The AP 502 includes a wireless communication device (WCD) 510 (although the AP 502 may itself also be referred to generally as a wireless communication device as used herein). For example, the wireless communication device 510 may be an example implementation of the wireless communication device 400 described with reference to FIG. 4. The AP 502 also includes multiple antennas 520 coupled with the wireless communication device 510 to transmit and receive wireless communications. In some implementations, the AP 502 additionally includes an application processor 530 coupled with the wireless communication device 510, and a memory 540 coupled with the application processor 530. The AP 502 further includes at least one external network interface 550 that enables the AP 502 to communicate with a core network or backhaul network to gain access to external networks including the Internet. For example, the external network interface 550 may include one or both of a wired (for example, Ethernet) network interface and a wireless network interface (such as a WWAN interface). Ones of the aforementioned components can communicate with other ones of the components directly or indirectly, over at least one bus. The AP 502 further includes a housing that encompasses the wireless communication device 510, the application processor 530, the memory 540, and at least portions of the antennas 520 and external network interface 550.

FIG. 5B shows a block diagram of an example STA 504. For example, the STA 504 can be an example implementation of the STA 104 described with reference to FIG. 1. The STA 504 includes a wireless communication device 515 (although the STA 504 may itself also be referred to generally as a wireless communication device as used herein). For example, the wireless communication device 515 may be an example implementation of the wireless communication device 400 described with reference to FIG. 4. The STA 504 also includes one or more antennas 525 coupled with the wireless communication device 515 to transmit and receive wireless communications. The STA 504 additionally includes an application processor 535 coupled with the wireless communication device 515, and a memory 545 coupled with the application processor 535. In some implementations, the STA 504 further includes a user interface (UI) 555 (such as a touchscreen or keypad) and a display 565, which may be integrated with the UI 555 to form a touchscreen display. In some implementations, the STA 504 may further include one or more sensors 575 such as, for example, one or more inertial sensors, accelerometers, temperature sensors, pressure sensors, or altitude sensors. Ones of the aforementioned components can communicate with other ones of the components directly or indirectly, over at least one bus. The STA 504 further includes a housing that encompasses the wireless communication device 515, the application processor 535, the memory 545, and at least portions of the antennas 525, UI 555, and display 565.

Referring to FIG. 6 through FIG. 10, several concepts and various aspects are described in the context of an AP and an STA, with the AP operating as the transmitter and the STA operating as the receiver. A TxOP that is initiated by the AP to the STA may be considered as "downlink," such as where the AP predicates transmission to the STA on a CCA procedure performed by the AP. The converse, such as where a TxOP is initiated by the STA to the AP, may be considered as "uplink." For clarity and conciseness, the various aspects and implementations of the present disclosure are presented as examples in a downlink arrangement, where a transmitter is implemented as an AP and a receiver is implemented as an STA. However, one having ordinary skill in the relevant art will appreciate that the concepts and various aspects described herein are also applicable in an uplink arrangement, where a transmitter is implemented as an STA and a receiver is implemented as an AP.

Figure 6:
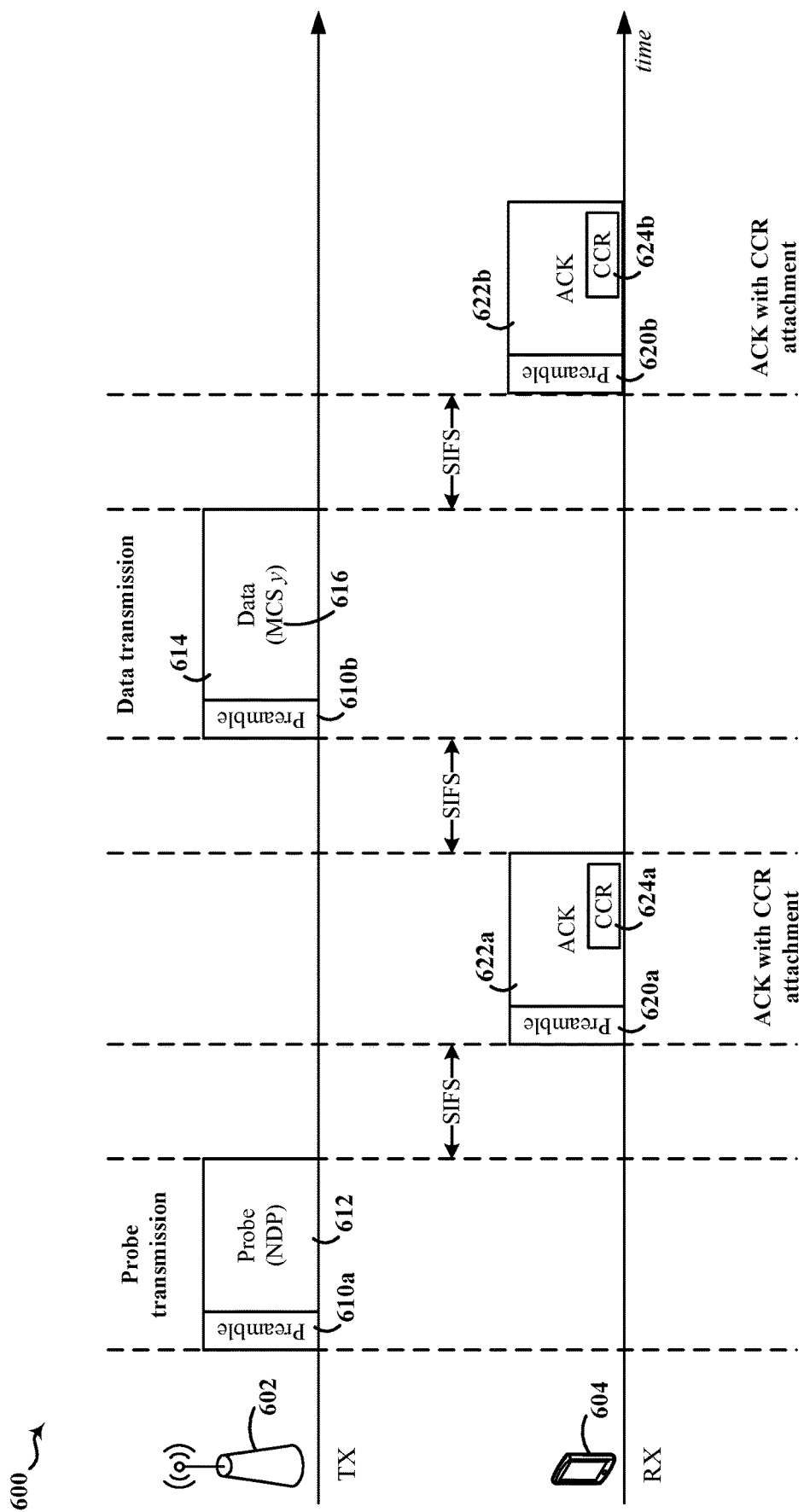
FIG. 6 shows a timing diagram depicting example wireless communications between an AP and a STA in which the STA reports an interference environment to the AP.

FIG. 6 shows a timing diagram depicting example wireless communications 600 between an AP 602 and a STA 604 in which the STA 604 reports an interference environment to the AP 602. The STA 604 may include information indicating at least one of interference conditions and propagation channel conditions in an interference environment report transmitted to the AP 602. In some implementations, the AP 602 may be one example of any of the APs 102 or 502 of FIGS. 1 and 5A, respectively. In some implementations, the STA 604 may be one example of any of the STAs 104 or 504 of FIGS. 1 and 5B, respectively. In the example of FIG. 6, the AP 602 may be operating to transmit (TX) data to the STA 604. Correspondingly, the STA 604 may be operating to receive (RX) data from the AP 602.

According to various aspects, the AP 602 may be configured to initiate a TxOP with a probe transmission. Accordingly, the AP 602 may generate and transmit a probe 612, which may have a preamble 610a prepended thereto. The probe 612 may be configured to elicit ACK feedback, to which the STA 604 may attach CCR. However, the probe 612 may be a null data packet (NDP), and therefore may lack a payload. The configuration of the probe 612 as an NDP may reduce interference the probe 612 may cause to an OBSS, for example, when the AP 602 transmits the probe 612 on top of an ongoing transmission of the OBSS. Furthermore, such an NDP configuration of the probe 612 may increase the probability of successful reception by the STA 604 relative to other frame types.

The STA 604 may receive the preamble 610a and the probe 612. In response, the STA 604 may generate an ACK message 622a that acknowledges the reception of the probe 612. In some aspects, the ACK message 622a may be a block ACK.

In addition, where the STA 604 is configured to do so, the STA 604 may generate CCR 624a and attach CCR 624a to the ACK message 622a. CCR 624a may indicate one or more metrics that indicate the interference environment observed at the STA 604 (the interference environment including signals and other energies that are detectable by the STA 604 but which are not intended to be received or decoded by the STA 604).

The STA 604 may perform one or more measurements—for example, during or prior to a short inter-frame (SIFS)—for metrics that reflect the performance of the STA 604 as a receiver, the occupancy status of the channel proximate to the receiver, and so forth. Examples of such metrics include an error magnitude vector (EVM), a packet error rate (PER), a signal-to-noise ratio (SNR), a signal-to-interference-plus-noise ratio (SINR), a reference signal strength indicator (RSSI), a minimum input sensitivity, a maximum input level, an adjacent channel rejection (ACR), a nonadjacent channel rejection, a received channel power indicator (RCPI), or another similar metric.

In some aspects, the STA 604 may include information indicating one or more values of such metrics in CCR 624a. In some other aspects, the STA 604 may use the metric values to determine (such as by obtaining, selecting, ascertaining, or otherwise calculating or computing) a set of transmission parameters that the STA 604 recommends for the AP 602 to use. For example, the STA 604 may obtain, select, ascertain, or determine at least one of a recommended MCS, a recommended $N_{SS}$, a recommended transmission rate, or another similar parameter that the AP 602 may use for a transmission to the STA 604.

Following the SIFS, the STA 604 may transmit the ACK message 622a with CCR 624a attachment to the AP 602. The STA 604 may prepend a preamble 620a to the ACK message 622a.

The AP 602 may receive the ACK message 622a with CCR 624a appended thereto. The AP 602 may be configured to obtain, select, ascertain, or determine one or more transmission parameters associated with or based on CCR 624a. For example, the AP 602 may be configured to select an MCS 616 of y from a set of potential MCSs w, x, y, z, where MCS y is found to be most suitable for channel conditions experienced at the STA 604, as indicated by the metric values from CCR 624a. Other examples of transmission parameters include transmission rate, transmission power, and $N_{SS}$.

In some aspects in which CCR 624a includes at least one transmission parameter that is recommended by the STA 604, the AP 602 may obtain, select, ascertain, or determine whether to accept the recommendation of the STA 604. If the AP 602 declines to accept the recommendation of the STA 604, the AP 602 may instead select a different transmission parameter, which may be more suitable for channel conditions or other factors experienced at the AP 602.

In some aspects, the AP 602 may evaluate the transmission parameters to obtain, select, ascertain, or determine whether the STA 604 is likely to receive a data transmission or whether the data transmission is likely to interfere with an ongoing transmission by an OBSS. In some aspects, the AP 602 may compare at least one of the transmission parameters with a corresponding threshold. For example, the AP 602 may compare a calculated transmission rate with a transmission rate threshold, and based on or associated with the comparison, the AP 602 may obtain, select, ascertain, or determine whether to proceed with the data transmission to the STA 604. Where the AP 602 finds the transmission rate fails to satisfy the transmission rate threshold (such as where the transmission rate is less than the transmission rate threshold), the AP 602 may back off the data transmission and wait for the interference environment proximate to the STA 604 to improve. Where the AP 602 finds the transmission rate satisfies the transmission rate threshold (such as where the transmission rate is greater than or equal to the transmission rate threshold), the AP 602 may proceed with the data transmission to the STA 604.

Where the AP 602 proceeds with the data transmission to the STA 604, the AP 602 may transmit a data frame 614 preceded by a preamble 610b following an SIFS. The data frame may be transmitted with the transmission parameters obtained, selected, ascertained, or determined from CCR 624a, such as the MCS 616 of y.

The STA 604 may receive the data frame 614 preceded by the preamble 610b. The STA 604 may attempt to decode the data frame 614, for example, based on or associated with the transmission parameters such as the MCS y. Based on or associated with whether the STA 604 successfully receives and decodes the data frame 614, the STA 604 may generate another ACK message 622b that acknowledges the reception of the data frame 614. In some aspects, the ACK message 622b may be a block ACK.

Further, the STA 604 may generate another CCR 624b and attach the other CCR 624b to the other ACK message 622b. As with the earlier CCR 624b, the other CCR 624b may indicate one or more metrics or recommended transmission parameters that reflect the interference environment observed at the STA 604. However, the other CCR 624b may be current relative to the time at which the data frame 614 is received, and so may more accurately reflect the current interference environment experienced at the STA 604. Following the SIFS, the STA 604 may transmit the other ACK message 622b with the other CCR 624b attachment to the AP 602. The STA 604 may prepend another preamble 620b to the other ACK message 622b.

The AP 602 may receive the ACK message 622b with the attached CCR 624b. As described above, the AP 602 may select or calculate another set of transmission parameters using the metric values or recommended transmission parameters indicated in CCR 624b. The AP 602 may transmit another data frame to the STA 604 using the other set of transmission parameters.

Figure 7:
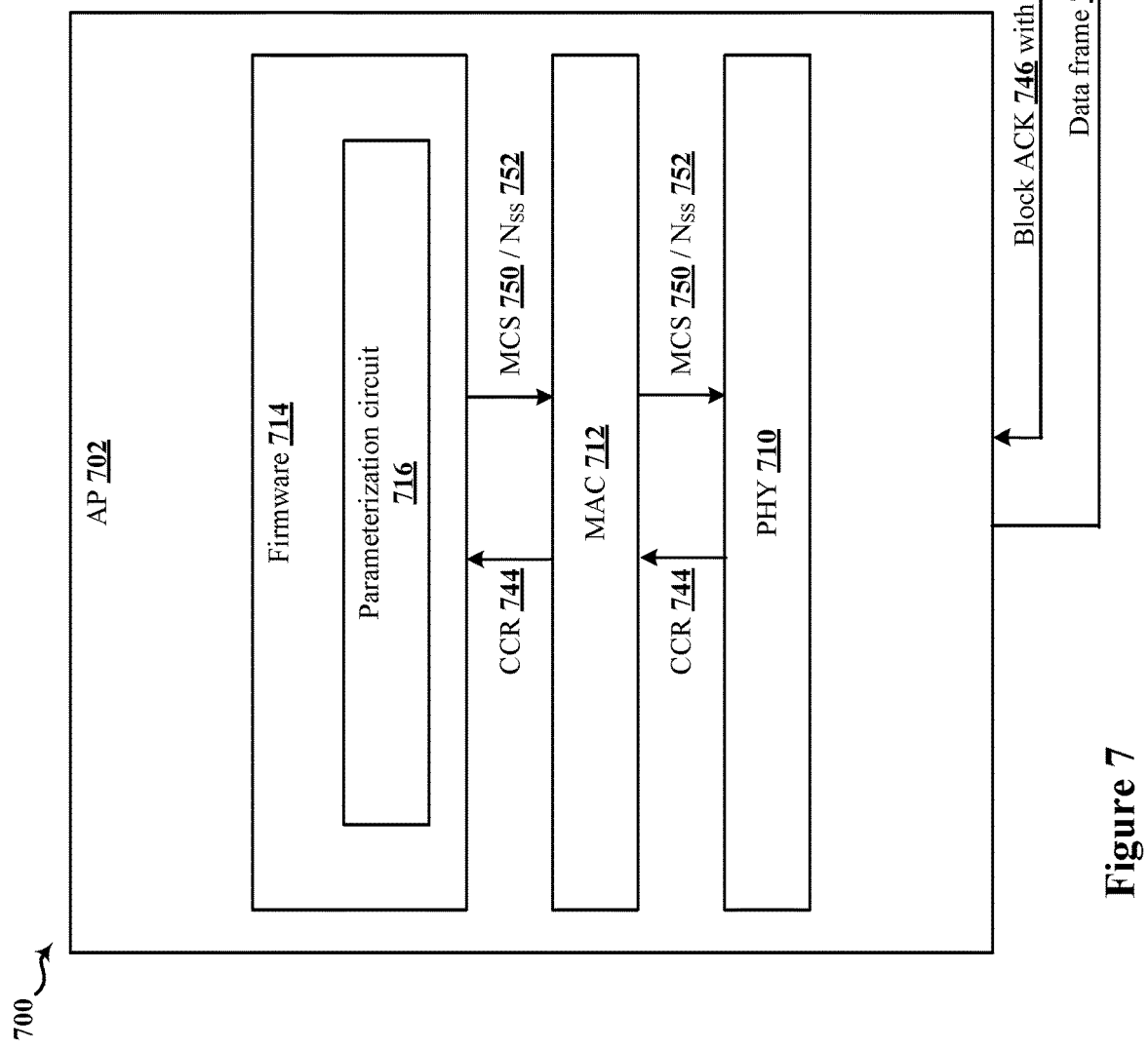
FIG. 7 shows example protocol stack architectures implemented in an AP and an STA.

FIG. 7 shows example protocol stack architectures 700 implemented in an AP 702 and an STA 704. In some implementations, the AP 702 may be one example of any of the APs 102, 502, or 602 of FIGS. 1, 5A, and 6, respectively. In some implementations, the STA 704 may be one example of any of the STAs 104, 504, or 604 of FIGS. 1, 5B, and 6, respectively.

In the example of FIG. 7, the AP 702 may include a protocol stack having a PHY layer 710 as a lower (or lowest) layer, and therefore residing below a MAC layer 712. In some aspects, firmware 714 may reside above the MAC layer 712 in the protocol stack, such as a network layer, transport layer, session layer, presentation layer, or application layer. In some other aspects, the firmware 714 may be implemented at the MAC layer 712 or at a layer that includes the MAC layer 712, such as a data link layer. The firmware 714 may include at least partially include a parameterization circuit 716, which may be at least partially implemented as one or more of firmware 714, hardware, or software.

The STA 704 may similarly include a PHY layer 720 that logically resides lower than a MAC layer 722. In addition, the STA 704 may include a CCR circuit 726. CCR circuit 726 may reside between the PHY layer 720 and the MAC layer 722, or CCR circuit 726 may be partially or totally integrated into one or both of the PHY layer 720 and the MAC layer 722. CCR circuit 726 may be at least partially implemented as one or more of firmware, hardware, or software.

The STA 704 may receive signaling on a shared wireless medium. For example, the STA 704 may receive per-tone or per-stream pilot or data signals. In some aspects, the STA 704 may receive a probe, such as a short probe PPDU or an NDP, configured to elicit CCR from the STA 704. The STA 704 may be configured to receive signaling (such as a probe) at the PHY layer 720, at which one or more measurements may be performed and the values of one or more metrics may be obtained, selected, ascertained, or determined. For example, STA 704 may calculate an error vector magnitude (EVM) 742 that may be indicative of the performance of the STA 704 as a receiver. The EVM 742 may be a per-tone, per-stream pilot or data EVM.

The EVM 742 may be provided to CCR circuit 726. CCR circuit 726 may be configured to determine (such as by obtaining, selecting, ascertaining, or otherwise calculating, selecting, or estimating) one or more transmission parameters that are recommended to be used for communication with the STA 704 given the environment of the STA 704. For example, CCR circuit 726 may obtain, select, ascertain, or determine at least one of a recommended MCS, a recommended $N_{SS}$, a recommended transmission rate, or one or more other recommended parameter that may be applied by the AP 702 for a data transmission. The one or more recommended transmission parameters may be indicated in CCR 744, which may be passed along the protocol stack to the MAC layer 722.

The MAC layer 722 may be configured to generate ACK feedback in response to signaling from the AP 702. For example, the MAC layer 722 may generate a block ACK 746 based on or associated with a short probe PPDU (such as an NDP) received from the AP 702. CCR 744 may be piggybacked on or attached to the block ACK 746, for example, at the MAC layer 722. The block ACK 746 with attached CCR 744 may be passed back down to the PHY layer 720, from which the block ACK 746 with attached CCR 744 may be transmitted to the AP 702.

The AP 702 may receive the block ACK 746 with attached CCR 744 at the PHY layer 710, and the attached CCR 744 may be passed up the protocol stack, through the MAC layer 712, to the firmware 714. At the firmware 714, the parameterization circuit 716 may determine (such as by obtaining, selecting, ascertaining, or otherwise calculating, selecting, or computing) a set of transmission parameters for transmitting a frame to the STA 704 using CCR 744 from the STA 704. For example, the parameterization circuit 716 may adopt one or more recommended parameters indicated by CCR 744 or the parameterization circuit 716 may select one or more parameters that are different from those indicated by CCR 744.

In some aspects, the parameterization circuit 716 may obtain, select, ascertain, or determine at least an MCS 750 and an $N_{SS}$ 752. The MCS 750 and $N_{SS}$ 752 may be passed down the protocol stack to the PHY layer 710, at which the MCS 750 and $N_{SS}$ 752 may be applied for transmission of a data frame 754 to the STA 704.

Figure 8:
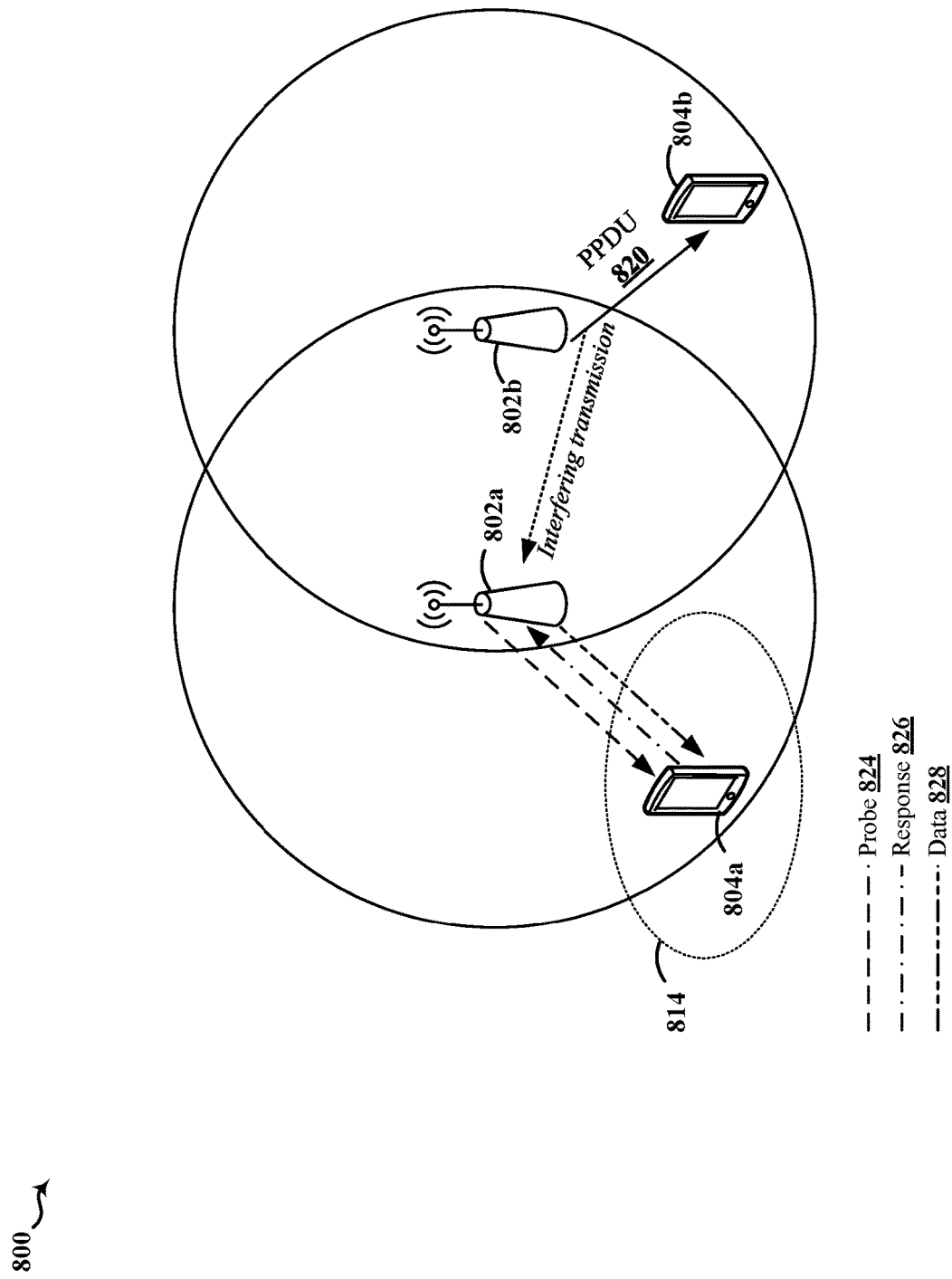
FIG. 8 shows a block diagram of an example communication environment in which clear channel assessment is based upon the interference environment proximate to an STA.

FIG. 8 shows a block diagram of an example communication environment 800 in which clear channel assessment is based upon the interference environment 814 proximate to a first STA 804*a*. In some implementations, a first AP 802*a* may be one example of any of the APs 102, 502, 602, or 702 of FIGS. 1, 5A, 6, and 7, respectively. In some implementations, the first STA 804*a* may be one example of any of the STAs 104, 504, 604, or 704 of FIGS. 1, 5B, 6, and 7, respectively.

CCA in existing networks relies on measurements performed by the transmitter, such as the AP. Inherently, such measurements reflect the channel conditions experienced at the transmitter, and therefore, the more remote the receiver is relative to the transmitter, the less likely the channel conditions at the transmitter will be germane to the receiver. Because the interference level at the receiver and the transmitter may differ, the transmitter may find a wireless medium to be occupied when the occupying transmission is negligible at the receiver. For example, as illustrated in FIG. 8, a second AP 802*b* may transmit a PPDU 820 to a second STA 804*b*. When the first AP 802*a* senses the channel, the first AP 802*a* may find the channel to be occupied, and therefore, the first AP 802*a* may defer transmission to the first STA 804*a*. From the perspective of the first STA 804*a*, interference from the PPDU 820 may be negligible because the second AP 802*b* and second STA 804*b* are substantially remote relative to the first STA 804*a*. However, the first AP 802*a*, believing the wireless medium to be occupied, has nonetheless deferred transmission to the first STA 804*a*. Such a missed transmission opportunity is spectrally inefficient.

Approaches to CCA that risk such spectral inefficiency are predicated upon the assumption that a transmitter is unaware of the interference environment at a receiver, as no solution previously existed in which a transmitter had apriori knowledge of the interference environment at a receiver. However, aspects of the present disclosure provide for fast CCR, which allows for a receiver to inform a transmitter of the interference environment at the receiver in advance of a data transmission for which a CCA procedure would be performed. Given such information prior to data transmission, the first AP 802*a* may be aware of a greater number of transmission opportunities, which may reduce instances of spectral inefficiency.

As illustrated by FIG. 8, two APs 802*a* and 802*b* may have overlapping coverage areas, which may be referred to as overlapping BSSs. A side effect of such OBSSs may include increased instances of interference to one AP when the other AP is transmitting. For example, the second AP 802*b* may transmit a PPDU 820 to the second STA 804*b*. However, the PPDU 820 may reach the first AP 802*a*, and so the first AP 802*a* may detect an interfering transmission associated with the second AP 802*b* (which may be an OBSS from the perspective of the first AP 802*a*). For example, the first AP 802*a* may listen on a wireless channel, and the first AP 802*a* may receive the PPDU 820 when so doing. The first AP 802*a* may inspect a header (such as a MAC header) of the PPDU 820 and find one or more addresses included therein, such as at least one of a source address, a transmitter address, a receiver address, and a destination address. The first AP 802*a* may obtain, select, ascertain, or determine that the PPDU neither originate from nor is addressed to the first AP 802*a*. As the PPDU 820 is occupying the channel, the first AP 802*a* may identify the duration field of a header included in the PPDU (such as a MAC header 314 of FIG. 3), and the value of the duration field may indicate the duration that the ongoing transmission is expected to occupy the wireless channel. The first AP 802*a* may update a NAV based on or associated with the value included in the duration field.

The first AP 802*a* may obtain, select, ascertain, or determine whether the interfering transmission satisfies an interference criterion associated with the first AP 802*a*. In some aspects, the interference criterion includes a threshold for a signal strength of the interfering transmission, such as an OBSS power density threshold. In some other aspects, the interference criterion includes a flag in a PPDU preamble or header of the interfering transmission, and the flag may indicate that the neighbors of the OBSS (such as the first AP 802*a*) should not transmit on top of or interfere with PPDU(s) transmitted by the OBSS. In some aspects, the first AP 802*a* may measure the signal strength or energy with which the interfering transmission is received at the first AP 802*a*. The first AP 802*a* may obtain a value for such a measurement, and the first AP 802*a* may compare the measurement value with an interference criterion (such as an OBSS power density threshold). In some aspects, the first AP 802*a* may obtain, select, ascertain, or determine whether the measurement value satisfies the interference criterion (such as where the measurement value is greater than or equal to the OBSS power density threshold) or fails to satisfy the interference criterion (such as where the measurement value is less than the OBSS power density threshold). For example, the first AP 802*a* may obtain, select, ascertain, or determine whether the interfering transmission satisfies the interference criterion associated with the first AP 802a by identifying whether a flag has been set in the header or preamble of the OBSS PPDU. The first AP 802a may obtain, select, ascertain, or determine that the interference criterion is satisfied when the flag is in the header or preamble of the OBSS PPDU. Correspondingly, the first AP 802a may obtain, select, ascertain, or determine that the interference criterion is not satisfied when the flag is not set in the header or preamble of the OBSS PPDU.

When the interfering transmission fails to satisfy the interference criterion associated with the first AP 802a, the first AP 802a may transmit, to the first STA 804a, a probe frame 824 soliciting CCR. In some instances, the first AP 802a may transmit the probe frame 824 immediately upon obtaining, selecting, ascertaining, or determining that the interfering transmission fails to satisfy the interference criterion if, when the first AP 802a obtains, selects, ascertains, or determines that the interfering transmission fails to satisfy the interference criterion, no backoff timer is active (or running) at the first AP 802a and the NAV duration at the first AP 802a is zero. That is, the first AP 802a may refrain from delaying transmission of the probe frame 824 by a backoff period associated with the interfering transmission satisfying the interference criterion when the interfering transmission fails to satisfy the interference criterion associated with the first AP 802a. In some instances in which a backoff timer is active (or running) or the NAV duration at the first AP 802a is non-zero when the first AP 802a obtains, selects, ascertains, or determines that the interfering transmission fails to satisfy the interference criterion, the first AP 802a may wait until expiry of the backoff timer (if the backoff timer was active) and until the NAV duration is equal to zero (if the NAV duration was non-zero) before transmitting the probe frame 824, although the first AP 802a may refrain from further delaying transmission of the probe frame 824 by an additional backoff period associated with the interfering transmission. In effect, when the interference criterion is not satisfied by the interfering transmission, the first AP 802a may ignore the interfering transmission in that the first AP 802a will not set or extend the NAV of the first AP 802a based on or associated with the interfering transmission, the first AP 802a will not freeze a backoff timer of the first AP 802a (if one is already running), and the first AP 802a will not wait for the interfering transmission (such as a PPDU of an OBSS) to complete before transmitting the probe frame 824.

CCR solicited by the first AP 802a may include information indicating an interference environment 814 observed by the first STA 804a. Information indicating an interference environment may include measurements, values, or other data that is indicative of or otherwise associated with at least one of one or more interference conditions observed by the first STA 804a and one or more propagation channel conditions observed by the first STA 804a. In some aspects, the probe frame 824 may be an NDP or other packet from which a payload is absent. In some aspects, the first AP 802a may transmit the probe frame 824 on top of the interfering transmission—for example, the first AP 802a may transmit the probe frame 824 on top of an ongoing transmission of an OBSS PPDU 820 (such as when the criteria for spatial reuse are satisfied).

When the interfering transmission satisfies the interference criterion associated with the first AP 802a, the first AP 802a may defer transmission of the probe frame 824. To do so, the first AP 802a may wait for a backoff period, and once the backoff period has elapsed, the first AP 802a may transmit the probe frame 824. As described above, the first AP 802a does not wait for a backoff period associated with the interfering transmission to elapse before transmitting the probe frame 824 when the interfering transmission fails to satisfy the interference criterion associated with the first AP 802a. Thus, relative to a point in time at which the first AP 802a obtains, selects, ascertains, or determines whether the interfering transmission satisfies the interference criterion, transmission of the probe frame 824 may occur earlier in time when the first AP 802a does not wait for a backoff period associated with the interfering transmission to elapse than when the first AP 802a does wait for the backoff period associated with the interfering transmission to elapse.

In some examples, the backoff period may be implemented via an RBO timer, which the first AP 802a may initiate or extend when the interfering transmission satisfies the interference criterion. In some other examples, the first AP 802a may freeze an RBO timer (if one is already running) when the interfering transmission satisfies the interference criterion, and the first AP 802a may unfreeze the RBO timer when the interfering transmission is complete. Upon expiration of the RBO timer, the first AP 802a may transmit the probe frame 824. In still further examples, the backoff period may be implemented via a NAV, which the first AP 802a configure based on or associated with a duration indicated in a MAC header of the interfering transmission, such as by setting or extending the NAV by the duration indicated in the MAC header of the interfering transmission. The first AP 802a may refrain from transmitting the probe frame 824 for a duration specified by the NAV of the first AP 802a. After the duration of the NAV elapses, the first AP 802a may transmit the probe frame 824.

The first AP 802a may obtain, select, ascertain, or determine whether a response 826 including CCR has been received. For example, the first AP 802a may obtain, select, ascertain, or determine that a response 826 including CCR has been received when the first AP 802a receives, within a timeout window, an ACK message (such as a block ACK) that acknowledges reception of the probe frame 824 by first STA 804a and the ACK message includes CCR. Conversely, the first AP 802a may obtain, select, ascertain, or determine that a response 826 including CCR has not been received when the first AP 802a fails to receive an ACK message that acknowledges reception of the probe frame 824 by first STA 804a within a timeout window or the first AP 802a receives an ACK message that does not include CCR.

When the response 826 including CCR has been received, the first AP 802a may obtain, select, ascertain, or determine, for transmission of the at least one data frame, each transmission parameter of a set of transmission parameters using CCR. The set of transmission parameters may include one or more of a transmission rate associated with transmitting the at least one data frame to the first STA 804a, an MCS, an $N_{SS}$, or a transmission rate. For example, the first AP 802a may apply one or more values indicated in the response 826 to at least one function that is used to obtain, select, ascertain, or determine at least one of an MCS, $N_{SS}$, transmission rate, or transmission power. The first AP 802a may evaluate the function having the one or more values applied thereto, and the first AP 802a may obtain a result that indicates at least one of the MCS, $N_{SS}$, transmission rate, or transmission power that the first AP 802a is to use for a transmission to the first STA 804a. In another example, the first AP 802a may evaluate a recommended transmission parameter included in CCR, such as by obtaining, selecting, ascertaining, or determining whether the recommended transmission parameter is within a certain range of acceptable parameter values or obtaining, selecting, ascertaining, or determining whether the overhead incurred by using a recommended transmission parameter would adversely affect communication with other first AP 802a. In some aspects, one or more transmission parameters of the set of transmission parameters includes at least one of a SNR, a RSSI, or an interference level associated with the interference environment 814.

When the response 826 including CCR has not been received, the first AP 802a may defer retransmission of the probe frame 824. For example, the first AP 802a may configure a duration to wait until retransmitting a probe frame 824. When the first AP 802a fails to receive a response 826 including CCR, the first AP 802a may initiate a timer that is set to the configured duration (such as 1 ms). When the timer has elapsed, the first AP 802a may retransmit the probe frame 824. In some aspects, the first AP 802a may refrain from increasing a contention window after which to retransmit the probe frame 824.

In some aspects, the first AP 802a may obtain, select, ascertain, or determine whether at least one transmission parameter of the set of transmission parameters satisfies a transmission parameter threshold. For example, the first AP 802a may select at least one of the transmission parameters from the set of transmission parameters, and the first AP 802a may compare the selected at least one transmission parameter with a corresponding threshold associated with the selected at least one transmission parameter. The first AP 802a may obtain, select, ascertain, or determine, based on or associated with the comparison, that the selected at least one transmission parameter satisfies the corresponding threshold where the first AP 802a finds the selected at least one transmission parameter is greater than or equal to the corresponding threshold. Conversely, the first AP 802a may obtain, select, ascertain, or determine, based on or associated with the comparison, that the selected at least one transmission parameter fails to satisfy the corresponding threshold where the first AP 802a finds the selected at least one transmission parameter is less than the corresponding threshold. In some aspects, the first AP 802a may select the transmission rate to use for the comparison. In some aspects, the first AP 802a may select or calculate at least one of the set of transmission parameters (such as an MCS or transmission rate) that enables a data frame to be transmitted on top of an OBSS PPDU.

When the at least one transmission parameter of the set of transmission parameters satisfies the transmission parameter threshold, the first AP 802a may transmit, to the first STA 804a, at least one frame of data 828 with the set of transmission parameters that is adapted using CCR. In some aspects, the set of transmission parameters (such as an MCS or transmission rate) may allow for the first AP 802a to transmit a data frame on top of an OBSS PPDU (such as the interfering transmission). Thus, in some instances, the first AP 802a may transmit the at least one frame of data 828 on top of the interfering transmission associated with the OBSS.

When the at least one transmission parameter of the set of transmission parameters fails to satisfy the transmission parameter threshold, the first AP 802a may refrain from increasing a contention window after which to retransmit the probe frame 824. Rather, the first AP 802a may maintain the contention window, and the first AP 802a may retransmit the probe frame 824 outside of the contention window. For example, the first AP 802a may initiate a timer upon obtaining, selecting, ascertaining, or determining that the at least one transmission parameter fails to satisfy the transmission parameter threshold. The first AP 802a may detect expiry of the timer, and associated with or based thereon, the first AP 802a may retransmit the probe frame 824.

Figure 9:
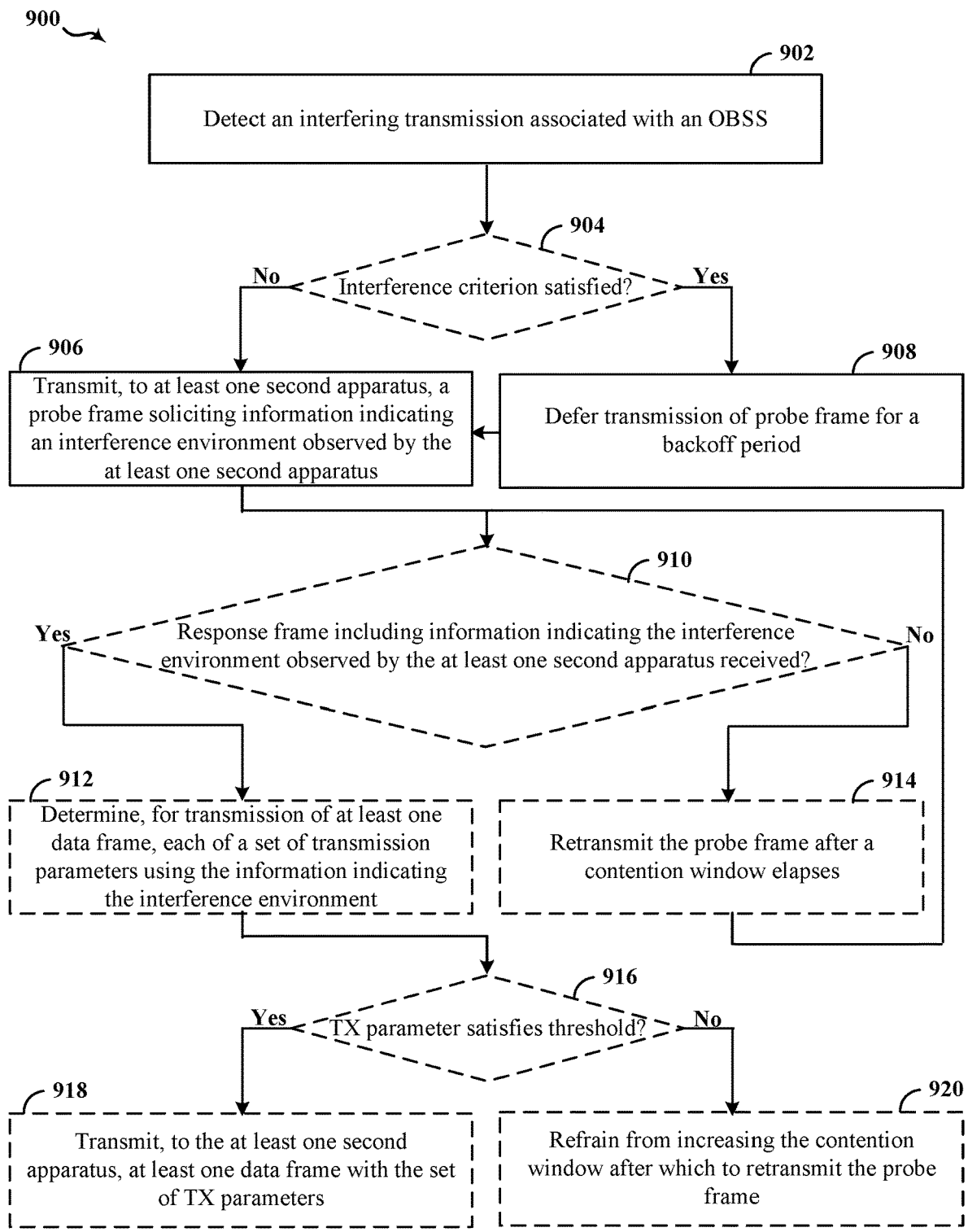
FIG. 9 shows a flowchart illustrating an example method for clear channel assessment in a wireless local area network (WLAN).

FIG. 9 shows a flowchart illustrating an example method 900 for clear channel assessment in a WLAN. In some implementations, the method 900 may be performed by an apparatus, such as an AP or a component of an AP. For example, the method 900 may be performed by or at any one of the APs 102, 502, 602, 702, or 802a of FIGS. 1, 5A, 6, 7, and 8, respectively. According to different aspects, one or more of the illustrated operations may be transposed, omitted, or contemporaneously performed.

At 902, the apparatus may detect an interfering transmission associated with an OBSS. For example, the apparatus may listen on a wireless channel, and the apparatus may receive a PPDU when so doing. The apparatus may inspect a header (such as a MAC header) of the PPDU and find one or more addresses included therein, such as at least one of a source address, a transmitter address, a receiver address, and a destination address. The apparatus may obtain, select, ascertain, or determine that the PPDU neither originated from nor is addressed to the BSS. As the PPDU is occupying the channel, the apparatus may identify the duration field of a header included in the PPDU (such as a MAC header), and the value of the duration field may indicate the duration that the ongoing transmission is expected to occupy the wireless channel. The apparatus may update a NAV based on or associated with the value included in the duration field.

In the context of FIG. 8, for example, the first AP 802a may detect the PPDU 820 transmitted by the second AP 802b. The first AP 802a may inspect a field (or subfield) of a header (such as a MAC header 314 of FIG. 3) in order to find a duration, with which the first AP 802a may update a NAV.

At 904, the apparatus may obtain, select, ascertain, or determine whether the interfering transmission satisfies an interference criterion associated with the apparatus. In some aspects, the interference criterion includes a threshold for a signal strength of the interfering transmission, such as an OBSS power density threshold. In some other aspects, the interference criterion includes a flag in a PPDU preamble or header of the interfering transmission, and the flag may indicate that the neighbors of the OBSS (such as the apparatus) should not transmit on top of or interfere with PPDU(s) transmitted by the OBSS. In some aspects, the apparatus may measure the signal strength or energy with which the interfering transmission is received at the apparatus. The apparatus may obtain a value for such a measurement, and the apparatus may compare the measurement value with an interference criterion (such as an OBSS power density threshold). In some aspects, the apparatus may obtain, select, ascertain, or determine whether the measurement value satisfies the interference criterion (such as where the measurement value is greater than or equal to the OBSS power density threshold) or fails to satisfy the interference criterion (such as where the measurement value is less than the OBSS power density threshold). For example, the apparatus may obtain, select, ascertain, or determine whether the interfering transmission satisfies the interference criterion associated with the apparatus by identifying whether a flag has been set in the header or preamble of the OBSS PPDU. The apparatus may obtain, select, ascertain, or determine that the interference criterion is satisfied when the flag is in the header or preamble of the OBSS PPDU. Correspondingly, the apparatus may obtain, select, ascertain, or determine that the interference criterion is not satisfied when the flag is not set in the header or preamble of the OBSS PPDU.

In the context of FIG. 8, for example, the first AP 802a may measure the signal strength with which the PPDU 820 transmitted by the second AP 802b is received at the first AP 802a. In some aspects, the first AP 802a may compare the measured signal strength with an OBSS power density threshold, and based on or associated with the comparison, the first AP 802a may obtain, select, ascertain, or determine whether the measured signal strength from the interfering transmission satisfies the OBSS power density threshold or fails to satisfy the OBSS power density threshold. In some other aspects, the first AP 802a may obtain, select, ascertain, or determine whether the interfering transmission satisfies the interference criterion associated with the first AP 802a by identifying whether a flag has been set in the header or preamble of the OBSS PPDU 820. The first AP 802a may obtain, select, ascertain, or determine that the interference criterion is satisfied when the flag is set in the header or preamble of the OBSS PPDU 820. Correspondingly, the first AP 802a may obtain, select, ascertain, or determine that the interference criterion is not satisfied when the flag is not set in the header or preamble of the OBSS PPDU 820.

At 906, when the interfering transmission fails to satisfy the interference criterion associated with the apparatus (described above at 904), the apparatus may transmit, to at least one second apparatus, a probe frame soliciting information indicating an interference environment observed by the at least one second apparatus. In some aspects, the probe frame may be an NDP or other packet from which a payload is absent. In some aspects, the apparatus may transmit the probe frame on top of the interfering transmission—for example, the apparatus may transmit the probe frame on top of an ongoing transmission of an OBSS PPDU (such as when the criteria for spatial reuse are satisfied). In some other aspects, the apparatus may include a backoff timer that is active (or running) or the NAV duration at the apparatus may be non-zero when the apparatus obtains, selects, ascertains, or determines that the interfering transmission fails to satisfy the interference criterion. In some examples of such other aspects, the apparatus may wait until expiry of the backoff timer (if the backoff timer was active) and until the NAV duration is equal to zero (if the NAV duration was non-zero) before transmitting the probe frame, although the apparatus may refrain from further delaying transmission of the probe frame 824 by an additional backoff period associated with the interfering transmission.

In the context of FIG. 8, for example, the first AP 802a may transmit, to the first STA 804a, the probe frame 824 soliciting information indicating an interference environment observed by the first STA 804a without delaying the transmission by a backoff period associated with the interfering transmission satisfying the interference criterion.

At 908, when the interfering transmission satisfies the interference criterion associated with the apparatus (described above at 904), the apparatus may defer transmission of the probe frame for a backoff period. According to various aspects, the backoff period may be observed via a backoff timer. The apparatus may initiate the backoff timer upon obtaining, selecting, ascertaining, or determining that the interfering transmission satisfies the interference criterion associated with the apparatus. The apparatus may further detect expiry of the backoff timer. In some implementations, upon detecting expiry of the backoff timer, the apparatus may transmit the probe frame (described above at 906). In some other implementations, upon expiry of the backoff timer, the apparatus may detect for another interfering transmission (as described above at 902), and if another interfering transmission satisfying the interference criterion is detected (as described above at 904), the apparatus may again defer transmission of the probe frame for another backoff period.

In some examples, the backoff timer may be implemented as a NAV maintained by the apparatus. In such examples, the apparatus may obtain, select, ascertain, or determine a channel occupancy duration as indicated in a MAC header of the interfering transmission. The apparatus may configure a duration of the NAV based on or associated with the channel occupancy duration, and the apparatus may refrain from transmitting the probe frame for the configured NAV duration. In some other examples, the backoff period may include an RBO timer. In some implementations, the apparatus may obtain, select, ascertain, or determine a pseudo-random number (which may be constrained by a maximum value), and the apparatus may configure the backoff timer with the pseudorandom number. In some other implementations, if an RBO timer is already running, the apparatus may freeze the RBO timer, for example, until the interfering transmission is complete or until the interfering transmission no longer satisfies the interference criterion, at which point the apparatus may unfreeze the RBO timer.

In the context of FIG. 8, for example, the first AP 802a may defer transmission of the probe frame 824 to the first STA 804a for a backoff period when the PPDU 820 satisfies an interference criterion. Once the backoff period elapses, the first AP 802a may transmit the probe frame 824 to the first STA 804a. For example, the first AP 802a may transmit the probe frame 824 to the first STA 804a after deferring transmission of the probe frame 824 for a backoff period when first AP 802a finds that the signal strength satisfies a threshold. In another example, the first AP 802a may transmit the probe frame 824 to the first STA 804a after deferring transmission of the probe frame 824 for a backoff period when first AP 802a finds that a flag has been set in a preamble or header of the PPDU, and the flag may instruct neighboring APs, such as the first AP 802a, to refrain from transmitting on top of PPDUs from the second AP 802b. In some aspects, the preamble or header of the PPDU may further include a channel occupancy duration, and the backoff period may be based on or associated with the channel occupancy duration.

At 910, the apparatus may obtain, select, ascertain, or determine whether a response frame including information indicating the interference environment observed by the at least one second apparatus has been received. For example, the apparatus may obtain, select, ascertain, or determine that a response frame including information indicating the interference environment observed by the at least one second apparatus has been received when the apparatus receives, within a timeout window, an ACK message (such as a block ACK) that acknowledges reception of the probe frame by at least one second apparatus and the ACK message includes information indicating the interference environment observed by the at least one second apparatus. Conversely, the apparatus may obtain, select, ascertain, or determine that a response frame including information indicating the interference environment observed by the at least one second apparatus has not been received when the apparatus fails to receive an ACK message that acknowledges reception of the probe frame by at least one second apparatus within a timeout window or the apparatus receives an ACK message that does not include information indicating the interference environment observed by the at least one second apparatus.

In the context of FIG. 8, for example, the first AP 802a may obtain, select, ascertain, or determine whether the response 826 including information indicating the interference environment 814 observed by the first STA 804*a* has been received within a timeout window.

At 912, when the response frame including information indicating the interference environment observed by the at least one second apparatus has been received (described above at 910), the apparatus may obtain, select, ascertain, or determine, for transmission of the at least one data frame, each transmission parameter of a set of transmission parameters using the information indicating the interference environment observed by the at least one second apparatus. The set of transmission parameters may include one or more of a transmission rate associated with transmitting the at least one data frame to the at least one second apparatus, an MCS, an $N_{SS}$, or a transmission rate. For example, the apparatus may apply one or more values indicated in the response frame to at least one function that is used to obtain, select, ascertain, or determine at least one of an MCS, $N_{SS}$, transmission rate, or transmission power. The apparatus may evaluate the function having the one or more values applied thereto, and the apparatus may obtain a result that indicates at least one of the MCS, $N_{SS}$, transmission rate, or transmission power that the apparatus is to use for a transmission to the at least one second apparatus. In another example, the apparatus may evaluate a recommended transmission parameter included in the information indicating the interference environment observed by the at least one second apparatus, such as by obtaining, selecting, ascertaining, or determining whether the recommended transmission parameter is within a certain range of acceptable parameter values or obtaining, selecting, ascertaining, or determining whether the overhead incurred by using a recommended transmission parameter would adversely affect communication with other apparatuses. In some aspects, one or more transmission parameters of the set of transmission parameters includes at least one of a signal-to-noise ratio (SNR), a received signal strength indicator (RSSI), or an interference level associated with the interference environment.

In the context of FIG. 8, for example, the first AP 802*a* may determine, for transmission of data 828, each transmission parameter of a set of transmission parameters using the information indicating the interference environment observed by the first STA 804*a* included in the response 826.

At 914, when the response frame including information indicating the interference environment observed by the at least one second apparatus has not been received (described above at 910), the apparatus may retransmit the probe frame after a contention window elapses. In other words, the apparatus may defer retransmission of the probe frame until after the contention window has elapsed. For example, the apparatus may configure a duration of a contention window to wait until retransmitting a probe frame. When the apparatus fails to receive a response frame including information indicating the interference environment observed by the at least one second apparatus, the apparatus may initiate a timer for the contention window that is set to the configured duration (such as 1 ms). When the timer for the contention window has elapsed, the apparatus may retransmit the probe frame. Further, the apparatus may obtain, select, ascertain, or determine whether a response frame including information indicating the interference environment observed by the at least one second apparatus has been received (described above at 910) based on or associated with the retransmitted probe frame. In some aspects, the apparatus may refrain from increasing a contention window after which to retransmit the probe frame when the response frame including information indicating the interference environment observed by the at least one second apparatus has not been received.

In the context of FIG. 8, for example, the first AP 802*a* may retransmit the probe frame 824 after a contention window elapses when failing to receive the response 826 that includes information indicating the interference environment 814 observed by the first STA 804*a*.

At 916, the apparatus may obtain, select, ascertain, or determine whether at least one transmission parameter of the set of transmission parameters satisfies a transmission parameter threshold. For example, the apparatus may select at least one of the transmission parameters from the set of transmission parameters, and the apparatus may compare the selected at least one transmission parameter with a corresponding threshold associated with the selected at least one transmission parameter. The apparatus may obtain, select, ascertain, or determine, based on or associated with the comparison, that the selected at least one transmission parameter satisfies the corresponding threshold where the apparatus finds the selected at least one transmission parameter is greater than or equal to the corresponding threshold. Conversely, the apparatus may obtain, select, ascertain, or determine, based on or associated with the comparison, that the selected at least one transmission parameter fails to satisfy the corresponding threshold where the apparatus finds the selected at least one transmission parameter is less than the corresponding threshold. In some aspects, the apparatus may select the transmission rate to use for the comparison. In some aspects, the apparatus may select or calculate at least one of the set of transmission parameters (such as an MCS or transmission rate) that enables a data frame to be transmitted on top of an OBSS PPDU.

In the context of FIG. 8, for example, the first AP 802*a* may obtain, select, ascertain, or determine whether at least one transmission parameter of a set of transmission parameters satisfies a transmission parameter threshold.

At 918, when the at least one transmission parameter of the set of transmission parameters satisfies the transmission parameter threshold (described above at 910), the apparatus may transmit, to the at least one second apparatus, at least one data frame with the set of transmission parameters that is adapted using the information indicating the interference environment observed by the at least one second apparatus. In some aspects, the set of transmission parameters (such as an MCS or transmission rate) may allow for the apparatus to transmit a data frame on top of an OBSS PPDU (such as the interfering transmission). Thus, in some instances, the apparatus may transmit the at least one data frame on top of the interfering transmission associated with the OBSS.

In the context of FIG. 8, for example, the first AP 802*a* may transmit, to the first STA 804*a*, the data 828 using the set of transmission parameters obtained, selected, ascertained, or determined based on or associated with the response 826.

At 920, when the at least one transmission parameter of the set of transmission parameters fails to satisfy the transmission parameter threshold (described above at 910), the apparatus may refrain from increasing a contention window after which to retransmit the probe frame. Rather, the apparatus may maintain the contention window, and the apparatus may retransmit the probe frame outside of the contention window (described above at 914). For example, the apparatus may initiate a timer having a duration associated with or based on a contention window upon obtaining, selecting, ascertaining, or determining that the at least one transmission parameter fails to satisfy the transmission parameter threshold. The apparatus may detect expiry of the timer, and associated with or based thereon, the apparatus may retransmit the probe frame.

In the context of FIG. 8, for example, the first AP 802a may refrain from increasing a contention window after which to retransmit the probe frame when at least one transmission parameter of the set of transmission parameters fails to satisfy a transmission parameter threshold.

Figure 10:
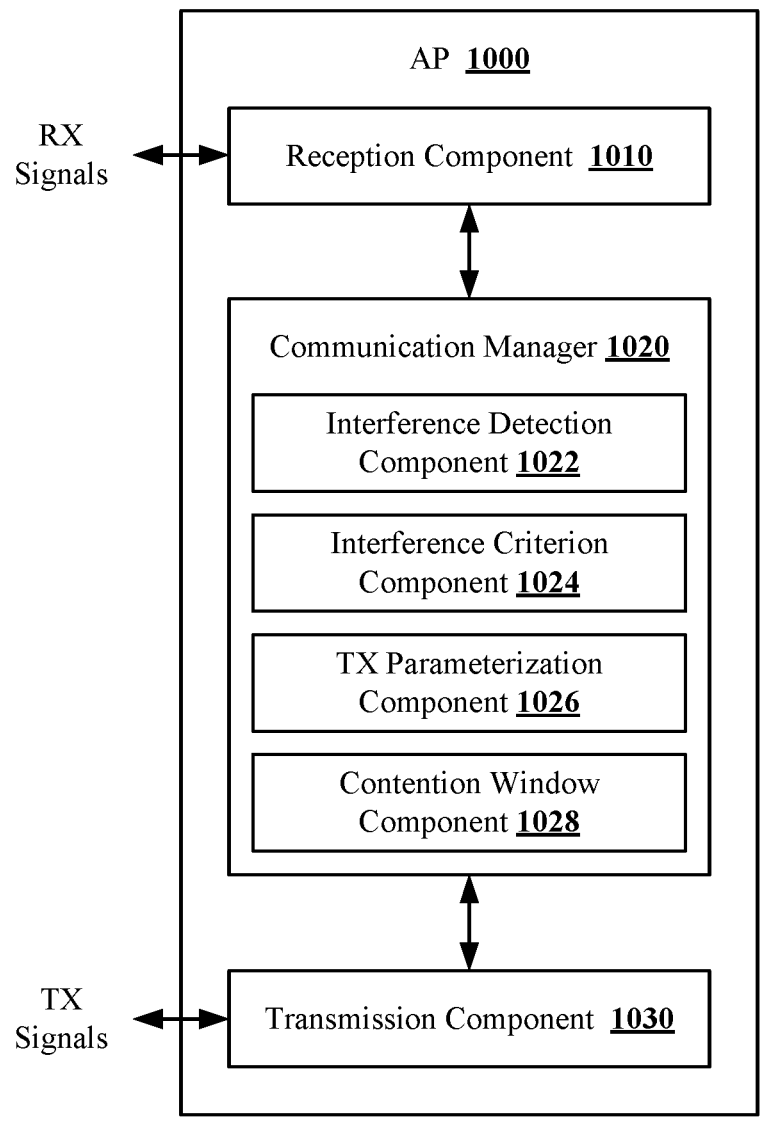
FIG. 10 shows a block diagram of an example apparatus configured to perform clear channel assessment.

FIG. 10 shows a block diagram of an example AP 1000 according to some implementations. In some implementations, the AP 1000 is configured to perform the method 900 described above with reference to FIG. 9. The AP 1000 can be an example implementation of the AP 502 or the WCD 510 described above with reference to FIG. 5A. For example, the AP 1000 can be a chip, SoC, chipset, package or device that includes at least one processor and at least one modem (for example, a Wi-Fi (IEEE 802.11) modem or a cellular modem).

The AP 1000 includes a reception component 1010, a communication manager 1020, and a transmission component 1030. The communication manager 1020 further includes a interference detection component 1022, an interference criterion component 1024, a TX parameterization component 1026, and a contention window component 1028. Portions of one or more of the components 1022, 1024, 1026, and 1028 may be implemented at least in part in hardware or firmware. In some implementations, at least some of the components 1022, 1024, 1026, or 1028 are implemented at least in part as software stored in a memory (such as the memory 540 of FIG. 5A or the memory 408 of FIG. 4). For example, portions of one or more of the components 1022, 1024, 1026, and 1028 can be implemented as non-transitory instructions (or "code") executable by a processor (such as the application processor 530 of FIG. 5A or the processor 406 of FIG. 4) to perform the functions or operations of the respective component.

The reception component 1010 is configured to receive RX signals, over a wireless channel, from one or more STAs. The transmission component 1030 is configured to transmit TX signals, over a wireless channel, to one or more STAs. The communication manager 1020 is configured to control or manage communications with one or more STAs.

In some implementations, the interference detection component 1022 may be configured to detect an interfering transmission associated with an OBSS. The interference criterion component 1024 may be configured to obtain, select, ascertain, or determine whether the interfering transmission satisfies (or fails to satisfy) an interference criterion associated with the AP 1000. The transmission component 1030 may be configured to transmit, to at least one STA, a probe frame soliciting information indicating an interference environment observed by the at least one STA when the interfering transmission fails to satisfy an interference criterion associated with the AP 1000. The transmission component 1030 may be further configured to defer transmission of the probe frame when the interfering transmission satisfies the interference criterion associated with the AP 1000. That is, the transmission component 1030 may be configured to transmit the probe frame after a backoff period when the interfering transmission satisfies the interference criterion associated with the AP 1000.

In some implementations, the reception component 1010 may be configured to receive a response frame from the at least one STA including the information indicating the interference environment observed by the at least one STA.

In some implementation, the transmission component 1030 may be further configured to transmit, to the at least one STA, at least one data frame with a set of transmission parameters that is adapted using the information indicating the interference environment observed by the at least one STA when a transmission parameter of the set of transmission parameters satisfies a threshold.

In some implementations, the TX parameterization component 1026 may be configured to obtain, select, ascertain, or determine, for transmission of the at least one data frame, each transmission parameter of the set of transmission parameters using the information indicating the interference environment observed by the at least one STA.

In some implementations, the contention window component 1028 may be configured to refrain from increasing a contention window after which to retransmit the probe frame when the transmission parameter of the set of transmission parameters fails to satisfy the threshold.

In some implementations, the contention window component 1028 may be further configured to refrain from increasing a contention window after which to retransmit the probe frame when failing to receive a response frame including the information indicating the interference environment observed by the at least one second apparatus.

In some implementations, the transmission component 1030 may be further configured to defer retransmission of the probe frame when failing to receive a response frame including the information indicating the interference environment observed by the at least one STA. The transmission component 1030 may be configured to retransmit the probe frame after a contention window elapses when failing to receive a response frame including the information indicating the interference environment observed by the at least one STA.

Implementation examples are described in the following numbered clauses:

1. A method for wireless communication at a wireless AP, including:
    transmitting, to at least one second apparatus, a probe frame soliciting information indicating an interference environment observed by the at least one second apparatus when an interfering transmission associated with an OBSS fails to satisfy an interference criterion associated with the first apparatus; and
    transmitting the probe frame to the at least one second apparatus after a backoff period when the interfering transmission satisfies the interference criterion associated with the first apparatus.

2. The method of clause 1, where the interference criterion includes a threshold for a signal strength of the interfering transmission or a flag in a preamble of the interfering transmission.

3. The method of either of clauses 1 or 2, where the interfering transmission indicates a duration that a wireless medium shared with the OBSS is to be occupied by the OBSS, and where the backoff period is associated with the duration when the interfering transmission satisfies the interference criterion.

4. The method of any of clauses 1 to 3, further including:
    receiving a response frame from the at least one second apparatus including the information indicating the interference environment observed by the at least one second apparatus; and
    transmitting, to the at least one second apparatus, at least one data frame with a set of transmission parameters that is adapted using the information indicating the interference environment observed by the at least one second apparatus when a transmission parameter of the set of transmission parameters satisfies a threshold.

5. The method of clause 4, where the transmission parameter of the set of transmission parameters includes a transmission rate associated with transmitting the at least one data frame to the at least one second apparatus.

6. The method of either of clauses 4 or 5, where the at least one data frame is transmitted on top of the interfering transmission associated with the OBSS.

7. The method of any of clauses 4 to 6, where the response frame includes a block acknowledgement frame that further includes the information indicating the interference environment observed by the at least one second apparatus.

8. The method of any of clauses 4 to 7, further including:
selecting, for transmission of the at least one data frame, each transmission parameter of the set of transmission parameters using the information indicating the interference environment observed by the at least one second apparatus.

9. The method of clause 8, where the set of transmission parameters includes at least one of a transmission rate, a transmission power, an MCS, or an $N_{SS}$.

10. The method of either of clauses 8 or 9, where the information indicating the interference environment observed by the at least one second apparatus includes at least one of:
one or more transmission parameters of the set of transmission parameters,
an SNR,
an RSSI, or
an interference level associated with the interference environment.

11. The method of any of clauses 4 to 10, further including:
refraining from increasing a contention window after which to retransmit the probe frame when the transmission parameter of the set of transmission parameters fails to satisfy the threshold.

12. The method of any of clauses 1 to 11, further including:
retransmitting, after a contention window elapses, the probe frame when failing to receive a response frame including the information indicating the interference environment observed by the at least one second apparatus.

13. The method of any of clauses 1 to 12, further including:
refraining from increasing a contention window after which to retransmit the probe frame when failing to receive a response frame including the information indicating the interference environment observed by the at least one second apparatus.

14. A wireless AP, including:
a memory; and
at least one processor communicatively coupled with the at least one memory, the at least one processor configured to cause the AP to:
transmit, to at least one second apparatus, a probe frame soliciting information indicating an interference environment observed by the at least one second apparatus when an interfering transmission associated with an OBSS fails to satisfy an interference criterion associated with the wireless AP; and
transmit the probe frame to the at least one second apparatus after a backoff period when the interfering transmission satisfies the interference criterion associated with the wireless AP.

15. The wireless AP of clause 14, where the interference criterion includes a threshold for a signal strength of the interfering transmission or a flag in a preamble of the interfering transmission.

16. The wireless AP of either of clauses 14 or 15, where the interfering transmission indicates a duration that a wireless medium shared with the OBSS is to be occupied by the OBSS, and where the backoff period is associated with the duration when the interfering transmission satisfies the interference criterion.

17. The wireless AP of any of clauses 14 to 16, where the at least one processor is further configured to cause the AP to
receive a response frame from the at least one second apparatus including the information indicating the interference environment observed by the at least one second apparatus; and
transmit, to the at least one second apparatus, at least one data frame with a set of transmission parameters that is adapted using the information indicating the interference environment observed by the at least one second apparatus when a transmission parameter of the set of transmission parameters satisfies a threshold.

18. The wireless AP of clause 17, where the transmission parameter of the set of transmission parameters includes a transmission rate associated with transmitting the at least one data frame to the at least one second apparatus.

19. The wireless AP of either of clauses 17 or 18, where the at least one data frame is transmitted on top of the interfering transmission associated with the OBSS.

20. The wireless AP of any of clauses 17 to 19, where the response frame includes a block acknowledgement frame that further includes the information indicating the interference environment observed by the at least one second apparatus.

21. The wireless AP of any of clauses 17 to 20, where the at least one processor is further configured to cause the AP to:
select, for transmission of the at least one data frame, each transmission parameter of the set of transmission parameters using the information indicating the interference environment observed by the at least one second apparatus.

22. The wireless AP of clause 21, where the set of transmission parameters includes at least one of a transmission rate, a transmission power, an MCS, or an $N_{SS}$.

23. The wireless AP of either of clauses 21 or 22, where the information indicating the interference environment observed by the at least one second apparatus includes at least one of:
one or more transmission parameters of the set of transmission parameters,
an SNR,
an RSSI, or
an interference level associated with the interference environment.

24. The wireless AP of any of clauses 17 to 23, where the at least one processor is further configured to cause the AP to:
refrain from increasing a contention window after which to retransmit the probe frame when the transmission parameter of the set of transmission parameters fails to satisfy the threshold.

25. The wireless AP of any of clauses 14 to 24, where the at least one processor is further configured to cause the AP to:

retransmit, after a contention window elapses, the probe frame when failing to receive a response frame including the information indicating the interference environment observed by the at least one second apparatus.

26. The wireless AP of clauses 14 to 25, where the at least one processor is further configured to cause the AP to:
refrain from increasing a contention window after which to retransmit the probe frame when failing to receive a response frame including the information indicating the interference environment observed by the at least one second apparatus.

27. A first apparatus for wireless communication, including:
means for transmitting, to at least one second apparatus, a probe frame soliciting information indicating an interference environment observed by the at least one second apparatus when an interfering transmission associated with an OBSS fails to satisfy an interference criterion associated with the first apparatus; and
means for transmitting the probe frame to the at least one second apparatus after a backoff period when the interfering transmission satisfies the interference criterion associated with the first apparatus.

28. The first apparatus of clause 27, where the interference criterion includes a threshold for a signal strength of the interfering transmission or a flag in a preamble of the interfering transmission.

29. The first apparatus of either of clauses 27 or 28, where the interfering transmission indicates a duration that a wireless medium shared with the OBSS is to be occupied by the OBSS, and where the backoff period is associated with the duration when the interfering transmission satisfies the interference criterion.

30. The first apparatus of any of clauses 27 to 29, further including:
means for receiving a response frame from the at least one second apparatus including the information indicating the interference environment observed by the at least one second apparatus; and
means for transmitting, to the at least one second apparatus, at least one data frame with a set of transmission parameters that is adapted using the information indicating the interference environment observed by the at least one second apparatus when a transmission parameter of the set of transmission parameters satisfies a threshold.

31. The first apparatus of clause 30, where the transmission parameter of the set of transmission parameters includes a transmission rate associated with transmitting the at least one data frame to the at least one second apparatus.

32. The first apparatus of either of clauses 30 or 31, where the at least one data frame is transmitted on top of the interfering transmission associated with the OBSS.

33. The first apparatus of any of clauses 30 to 32, where the response frame includes a block acknowledgement frame that further includes the information indicating the interference environment observed by the at least one second apparatus.

34. The first apparatus of any of clauses 30 to 33, further including:
means for selecting, for transmission of the at least one data frame, each transmission parameter of the set of transmission parameters using the information indicating the interference environment observed by the at least one second apparatus.

35. The first apparatus of clause 34, where the set of transmission parameters includes at least one of a transmission rate, a transmission power, a MCS, or a number of spatial streams ($N_{SS}$).

36. The first apparatus of either of clauses 34 or 35, where the information indicating the interference environment observed by the at least one second apparatus includes at least one of:
one or more transmission parameters of the set of transmission parameters,
an SNR,
an RSSI, or
an interference level associated with the interference environment.

37. The first apparatus of any of clauses 30 to 36, further including:
means for refraining from increasing a contention window after which to retransmit the probe frame when the transmission parameter of the set of transmission parameters fails to satisfy the threshold.

38. The first apparatus of any of clauses 27 to 37, further including:
means for retransmitting, after a contention window elapses, the probe frame when failing to receive a response frame including the information indicating the interference environment observed by the at least one second apparatus.

39. The first apparatus of any of clauses 27 to 38, further including:
means for refraining from increasing a contention window after which to retransmit the probe frame when failing to receive a response frame including the information indicating the interference environment observed by the at least one second apparatus.

40. A computer-readable medium storing computer-executable code for wireless communication by a first apparatus, the code, when executed by a processor, to cause the first apparatus to:
transmit, to at least one second apparatus, a probe frame soliciting information indicating an interference environment observed by the at least one second apparatus when an interfering transmission associated with an OBSS fails to satisfy an interference criterion associated with the first apparatus; and
transmit the probe frame to the at least one second apparatus after a backoff period when the interfering transmission satisfies the interference criterion associated with the first apparatus.

41. The computer-readable medium of clause 40, where the interference criterion includes a threshold for a signal strength of the interfering transmission or a flag in a preamble of the interfering transmission.

42. The computer-readable medium of either of clauses 40 or 41, where the interfering transmission indicates a duration that a wireless medium shared with the OBSS is to be occupied by the OBSS, and where the backoff period is associated with the duration when the interfering transmission satisfies the interference criterion.

43. The computer-readable medium of any of clauses 40 to 42, where the code, when executed by the processor, to further cause the first apparatus to:
receive a response frame from the at least one second apparatus including the information indicating the interference environment observed by the at least one second apparatus; and
transmit, to the at least one second apparatus, at least one data frame with a set of transmission parameters that is adapted using the information indicating the interference environment observed by the at least one second apparatus when a transmission parameter of the set of transmission parameters satisfies a threshold.

44. The computer-readable medium of clause 43, where the transmission parameter of the set of transmission parameters includes a transmission rate associated with transmitting the at least one data frame to the at least one second apparatus.

45. The computer-readable medium of either of clauses 43 or 44, where the at least one data frame is transmitted on top of the interfering transmission associated with the OBSS.

46. The computer-readable medium of any of clauses 43 to 45, where the response frame includes a block acknowledgement frame that further includes the information indicating the interference environment observed by the at least one second apparatus.

47. The computer-readable medium of any of clauses 43 to 46, where the code, when executed by the processor, to further cause the first apparatus to:
select, for transmission of the at least one data frame, each transmission parameter of the set of transmission parameters using the information indicating the interference environment observed by the at least one second apparatus.

48. The computer-readable medium of clause 47, where the set of transmission parameters includes at least one of a transmission rate, a transmission power, a MCS, or a $N_{SS}$.

49. The computer-readable medium of either of clauses 47 or 48, where the information indicating the interference environment observed by the at least one second apparatus includes at least one of:
one or more transmission parameters of the set of transmission parameters,
an SNR,
an RSSI, or
an interference level associated with the interference environment.

50. The computer-readable medium of any of clauses 43 to 49, where the code, when executed by the processor, to further cause the first apparatus to:
refrain from increasing a contention window after which to retransmit the probe frame when the transmission parameter of the set of transmission parameters fails to satisfy the threshold.

51. The computer-readable medium of any of clauses 40 to 50, where the code, when executed by the processor, to further cause the first apparatus to:
retransmit, after a contention window elapses, the probe frame when failing to receive a response frame including the information indicating the interference environment observed by the at least one second apparatus.

52. The computer-readable medium of any of clauses 40 to 51, where the code, when executed by the processor, to further cause the first apparatus to:
refrain from increasing a contention window after which to retransmit the probe frame when failing to receive a response frame including the information indicating the interference environment observed by the at least one second apparatus.

As used herein, a phrase referring to "at least one of" or "one or more of" a list of items refers to any combination of those items, including single members. For example, "at least one of: a, b, or c" is intended to cover the possibilities of: a only, b only, c only, a combination of a and b, a combination of a and c, a combination of b and c, and a combination of a and b and c. As used herein, "based on" is intended to be interpreted in the inclusive sense, unless otherwise explicitly indicated. For example, "based on" may be used interchangeably with "based at least in part on," unless otherwise explicitly indicated. Specifically, unless a phrase refers to "based on only 'a,'" or the equivalent in context, whatever it is that is "based on 'a,'" or "based at least in part on 'a,'" may be based on "a" alone or based on a combination of "a" and one or more other factors, conditions, or information.

The various illustrative components, logic, logical blocks, modules, circuits, operations and algorithm processes described in connection with the implementations disclosed herein may be implemented as electronic hardware, firmware, software, or combinations of hardware, firmware or software, including the structures disclosed in this specification and the structural equivalents thereof. The interchangeability of hardware, firmware and software has been described generally, in terms of functionality, and illustrated in the various illustrative components, blocks, modules, circuits and processes described above. Whether such functionality is implemented in hardware, firmware or software depends upon the particular application and design constraints imposed on the overall system.

Various modifications to the implementations described in this disclosure may be readily apparent to persons having ordinary skill in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein.

Additionally, various features that are described in this specification in the context of separate implementations also can be implemented in combination in a single implementation. Conversely, various features that are described in the context of a single implementation also can be implemented in multiple implementations separately or in any suitable subcombination. As such, although features may be described above as acting in particular combinations, and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flowchart or flow diagram. However, other operations that are not depicted can be incorporated in the example processes that are schematically illustrated. For example, one or more additional operations can be performed before, after, simultaneously, or between any of the illustrated operations. In some circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

What is claimed is:

1. A method of wireless communication at a first apparatus, comprising:
   transmitting, to at least one second apparatus, a probe frame soliciting information indicating an interference environment observed by the at least one second apparatus when an interfering transmission associated with an overlapping basic service set (OBSS) fails to satisfy an interference criterion associated with the first apparatus; and
   transmitting the probe frame to the at least one second apparatus after a backoff period when the interfering transmission satisfies the interference criterion associated with the first apparatus,
   wherein the interfering transmission indicates a duration that a wireless medium shared with the OBSS is to be occupied by the OBSS.

2. The method of claim 1, wherein the interference criterion comprises a threshold for a signal strength of the interfering transmission or a flag in a preamble of the interfering transmission.

3. The method of claim 1, wherein the backoff period is associated with the duration when the interfering transmission satisfies the interference criterion.

4. The method of claim 1, further comprising:
   receiving a response frame from the at least one second apparatus including the information indicating the interference environment observed by the at least one second apparatus; and
   transmitting, to the at least one second apparatus, at least one data frame with a set of transmission parameters that is adapted using the information indicating the interference environment observed by the at least one second apparatus when a transmission parameter of the set of transmission parameters satisfies a threshold.

5. The method of claim 4, wherein the transmission parameter of the set of transmission parameters comprises a transmission rate associated with transmitting the at least one data frame to the at least one second apparatus.

6. The method of claim 4, wherein the at least one data frame is transmitted on top of the interfering transmission associated with the OBSS.

7. The method of claim 4, wherein the response frame comprises a block acknowledgement frame that further includes the information indicating the interference environment observed by the at least one second apparatus.

8. The method of claim 4, further comprising:
   selecting, for transmission of the at least one data frame, each transmission parameter of the set of transmission parameters using the information indicating the interference environment observed by the at least one second apparatus.

9. The method of claim 8, wherein the set of transmission parameters comprises at least one of a transmission rate, a transmission power, a modulation and coding scheme (MCS), or a number of spatial streams (NSS).

10. The method of claim 8, wherein the information indicating the interference environment observed by the at least one second apparatus comprises at least one of:
    one or more transmission parameters of the set of transmission parameters,
    a signal-to-noise ratio (SNR),
    a received signal strength indicator (RSSI), or
    an interference level associated with the interference environment.

11. The method of claim 4, further comprising:
    refraining from increasing a contention window after which to retransmit the probe frame when the transmission parameter of the set of transmission parameters fails to satisfy the threshold.

12. The method of claim 1, further comprising:
    retransmitting, after a contention window elapses, the probe frame when failing to receive a response frame including the information indicating the interference environment observed by the at least one second apparatus.

13. The method of claim 1, further comprising:
    refraining from increasing a contention window after which to retransmit the probe frame when failing to receive a response frame including the information indicating the interference environment observed by the at least one second apparatus.

14. A first apparatus for wireless communication, comprising:
    a memory; and
    at least one processor coupled to the memory and configured to:
       transmit, to at least one second apparatus, a probe frame soliciting information indicating an interference environment observed by the at least one second apparatus when an interfering transmission associated with an overlapping basic service set (OBSS) fails to satisfy an interference criterion associated with the first apparatus; and
       transmit the probe frame to the at least one second apparatus after a backoff period when the interfering transmission satisfies the interference criterion associated with the first apparatus,
    wherein the interfering transmission indicates a duration that a wireless medium shared with the OBSS is to be occupied by the OBSS.

15. The first apparatus of claim 14, wherein the interference criterion comprises a threshold for a signal strength of the interfering transmission or a flag in a preamble of the interfering transmission.

16. The first apparatus of claim 14, wherein the backoff period is associated with the duration when the interfering transmission satisfies the interference criterion.

17. The first apparatus of claim 14, wherein the at least one processor is further configured to:
    receive a response frame from the at least one second apparatus including the information indicating the interference environment observed by the at least one second apparatus; and
    transmit, to the at least one second apparatus, at least one data frame with a set of transmission parameters that is adapted using the information indicating the interference environment observed by the at least one second apparatus when a transmission parameter of the set of transmission parameters satisfies a threshold.

18. The first apparatus of claim 17, wherein the transmission parameter of the set of transmission parameters comprises a transmission rate associated with transmitting the at least one data frame to the at least one second apparatus.

19. The first apparatus of claim 17, wherein the at least one data frame is transmitted on top of the interfering transmission associated with the OBSS.

20. The first apparatus of claim 17, wherein the response frame comprises a block acknowledgement frame that further includes the information indicating the interference environment observed by the at least one second apparatus.

21. The first apparatus of claim 17, wherein the at least one processor is further configured to:

select, for transmission of the at least one data frame, each transmission parameter of the set of transmission parameters using the information indicating the interference environment observed by the at least one second apparatus.

22. The first apparatus of claim 21, wherein the set of transmission parameters comprises at least one of a transmission rate, a transmission power, a modulation and coding scheme (MCS), or a number of spatial streams (NSS).

23. The first apparatus of claim 21, wherein the information indicating the interference environment observed by the at least one second apparatus comprises at least one of:
 one or more transmission parameters of the set of transmission parameters,
 a signal-to-noise ratio (SNR),
 a received signal strength indicator (RSSI), or
 an interference level associated with the interference environment.

24. The first apparatus of claim 17, wherein the at least one processor is further configured to:
 refrain from increasing a contention window after which to retransmit the probe frame when the transmission parameter of the set of transmission parameters fails to satisfy the threshold.

25. The first apparatus of claim 14, wherein the at least one processor is further configured to:
 retransmit, after a contention window, the probe frame when failing to receive a response frame including the information indicating the interference environment observed by the at least one second apparatus.

26. The first apparatus of claim 14, wherein the at least one processor is further configured to:
 refrain, from increasing a contention window after which to retransmit the probe frame when failing to receive a response frame including the information indicating the interference environment observed by the at least one second apparatus.

27. A first apparatus for wireless communication, comprising:
 means for transmitting, to at least one second apparatus, a probe frame soliciting information indicating an interference environment observed by the at least one second apparatus when an interfering transmission associated with an overlapping basic service set (OBSS) fails to satisfy an interference criterion associated with the first apparatus; and
 means for transmitting the probe frame to the at least one second apparatus after a backoff period when the interfering transmission satisfies the interference criterion associated with the first apparatus,
 wherein the interfering transmission indicates a duration that a wireless medium shared with the OBSS is to be occupied by the OBSS.

28. The first apparatus of claim 27, further comprising:
 means for receiving a response frame from the at least one second apparatus including the information indicating the interference environment observed by the at least one second apparatus; and
 means for transmitting, to the at least one second apparatus, at least one data frame with a set of transmission parameters that is adapted using the information indicating the interference environment observed by the at least one second apparatus when a transmission parameter of the set of transmission parameters satisfies a threshold.

29. A computer-readable medium storing computer-executable code for wireless communication by a first apparatus, the code, when executed by a processor, to cause the first apparatus to:
 transmit, to at least one second apparatus, a probe frame soliciting information indicating an interference environment observed by the at least one second apparatus when an interfering transmission associated with an overlapping basic service set (OBSS) fails to satisfy an interference criterion associated with the first apparatus; and
 transmit the probe frame to the at least one second apparatus after a backoff period when the interfering transmission satisfies the interference criterion associated with the first apparatus,
 wherein the interfering transmission indicates a duration that a wireless medium shared with the OBSS is to be occupied by the OBSS.

30. The computer-readable medium of claim 29, further comprising code to cause the first apparatus to:
 receive a response frame from the at least one second apparatus including the information indicating the interference environment observed by the at least one second apparatus; and
 transmit, to the at least one second apparatus, at least one data frame with a set of transmission parameters that is adapted using the information indicating the interference environment observed by the at least one second apparatus when a transmission parameter of the set of transmission parameters satisfies a threshold.

* * * * *